(12) United States Patent
Stenson et al.

(10) Patent No.: US 12,097,873 B2
(45) Date of Patent: Sep. 24, 2024

(54) DYNAMIC SENSOR DATA AUGMENTATION VIA DEEP LEARNING LOOP

(71) Applicant: GM Cruise Holdings LLC, San Francisco, CA (US)

(72) Inventors: Richard Stenson, Miami, FL (US); Javier Fernandez Rico, Concord, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 416 days.

(21) Appl. No.: 17/527,715

(22) Filed: Nov. 16, 2021

(65) Prior Publication Data
US 2023/0150529 A1    May 18, 2023

(51) Int. Cl.
*B60W 60/00* (2020.01)
*G06N 20/00* (2019.01)
*G06V 10/82* (2022.01)
*G06V 20/56* (2022.01)

(52) U.S. Cl.
CPC .......... *B60W 60/001* (2020.02); *G06N 20/00* (2019.01); *G06V 10/82* (2022.01); *G06V 20/56* (2022.01); *B60W 2420/408* (2024.01); *B60W 2554/4049* (2020.02); *B60W 2555/20* (2020.02)

(58) Field of Classification Search
CPC ......... B60W 60/001; B60W 2420/408; B60W 2554/4049; B60W 2555/20; B60W 40/02; B60W 2556/35; G06N 20/00; G06N 20/56; G06N 3/0464; G06N 3/047; G06N 3/0475; G06N 3/084; G06N 3/094; G06V 10/82

See application file for complete search history.

(56) References Cited

U.S. PATENT DOCUMENTS

| | | | | |
|---|---|---|---|---|
| 11,475,276 | B1 * | 10/2022 | Shrivastava | G06N 3/094 |
| 2019/0129436 | A1 * | 5/2019 | Sun | G06N 3/08 |
| 2021/0237767 | A1 * | 8/2021 | Khoreva | G06N 3/045 |
| 2021/0276587 | A1 * | 9/2021 | Urtasun | G06N 3/08 |
| 2022/0198609 | A1 * | 6/2022 | Carbune | G06T 5/00 |
| 2022/0314993 | A1 * | 10/2022 | Bagschik | G06N 3/094 |
| 2023/0037142 | A1 * | 2/2023 | Nayhouse | G05D 1/0088 |
| 2023/0192126 | A1 * | 6/2023 | Kumavat | G01C 21/3461 701/23 |

* cited by examiner

*Primary Examiner* — John B Strege

(57) ABSTRACT

Systems and methods for dynamic sensor data adaptation using a deep learning loop are provided. A method includes classifying, using a discriminator model, a first object from first sensor data associated with a first sensing condition, wherein the discriminator model is trained for a second sensing condition different from the first sensing condition; generating, using a generator model in response to the discriminator model failing to classify the first object, second sensor data representing a second object comprising at least a modified element of the first object; classifying, using the discriminator model, the second object from the second sensor data; and adapting, based at least in part on a difference between the first object and the second object in response to the discriminator model successfully classifying the second object, a machine learning model associated with object classification for the first sensing condition.

19 Claims, 9 Drawing Sheets

DYNAMIC SENSOR DATA AUGMENTATION VIA DEEP LEARNING LOOP

TECHNICAL FIELD

The present disclosure relates generally to autonomous vehicles, and more particularly, to dynamic sensor data adaptation using a deep learning loop.

BACKGROUND

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating driving safety. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
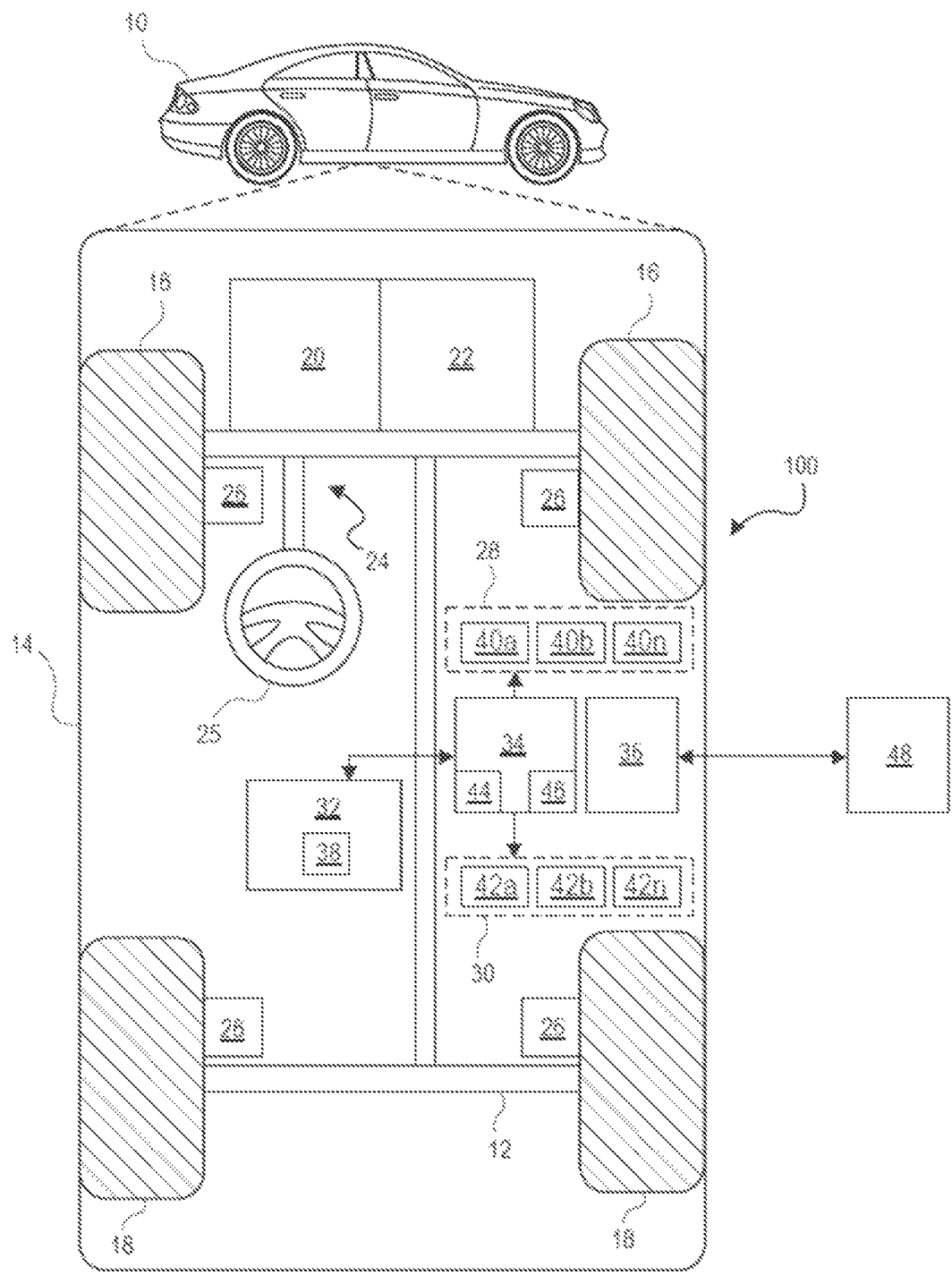
FIG. 1 illustrates an exemplary autonomous vehicle with sensor data adaptation, according to some embodiments of the present disclosure.

The systems, methods and devices of this disclosure have several innovative aspects, no one of which is solely responsible for the attributes disclosed herein. Details of one or more implementations of the subject matter described in this specification are set forth in the description below and the accompanying drawings.

Autonomous vehicles can provide many benefits. For instance, autonomous vehicles may have the potential to transform urban living by offering opportunity for safe, efficient, accessible and affordable transportation. However, training and testing autonomous vehicles in the physical world can be challenging. For instance, to provide a good testing coverage, an autonomous vehicle may be trained and tested to respond to various driving scenarios (e.g., millions of physical road test scenarios) before it can be deployed in a real-life roadway system. As such, it may be costly and time consuming to train and test autonomous vehicles on physical roads. Furthermore, there may be test cases that are difficult to create or too dangerous to cover in the physical world. Accordingly, it may be desirable to train and validate autonomous vehicles in a simulation environment, covering at least a majority of the test scenarios. In this way, the amount of physical road tests can be reduced while still providing good test coverage. Further, autonomous driving algorithms can be developed, fine-tuned, and tested with a shorter turn-around time on a simulation platform than it would have been with physical road tests.

Building a realistic simulation environment for autonomous vehicle training and validation can be challenging. For instance, to provide a realistic simulation model for a city, an enormous amount of data may be collected (e.g., using data collection vehicle(s)) in order to replicate or simulate layouts of roadway systems, traffic lights, street lights, pedestrians, vehicles, buildings, environmental conditions, and/or any surroundings factors and/or elements in the city. After collecting the data, the simulation model may be generated, trained, and tested to ensure that the simulation model provides a realistic representation (e.g., a direct copy) of the city. Subsequently, the simulation model may be used for developing, testing, and/or validating new algorithms (e.g., sensor detection algorithms, artificial intelligence (AI)/ML algorithms, neural network algorithms, deep learning algorithms, and/or other development efforts for autonomous vehicles) prior to deploying those new algorithms onto actual autonomous vehicles. In some instances, it may take months or years to train a realistic simulation model for a city. As self-driving technology continues to develop and the demands for autonomous vehicles continue to grow, it may be impractical to spend a large amount of time to train a simulation model for each subsequent city.

The present disclosure describes mechanisms for increasing efficiency in training and/or adapting simulation data and/or simulation models for new cities and/or new environmental conditions through the use of a closed-loop deep learning system. For example, the deep learning system may include a discriminator model (e.g., a ML model) and a generator model (e.g., a ML model) operating in a closed loop. The discriminator model may identify or classify objects within a scene while the generator model may add, adapt, augment, or more generally, modify the scene. In an embodiment, the discriminator model may classify a first object from first sensor data associated with a first sensing condition. However, the discriminator model may be primarily trained for classifying objects associated with a second sensing condition different from the first sensing condition. As an example, the first and second sensing conditions may correspond to at least different geographical locations (e.g., different cities). As another example, the first and second sensing conditions may correspond to at least different time of the data (e.g., daytime vs nighttime). As a further example, the first and second sensing conditions may correspond to at least different atmospheric or environmental conditions (e.g., sunshine vs snow). Because of the differences between the first sensing condition and the second sensing condition, in some instances, the discriminator model may be unable to classify the first object from the first sensor data associated with the first sensing condition correctly (e.g., determine whether the first object is a cone, tree, pedestrian, etc.).

According to embodiments of the present disclosure, the generator model and the discriminator model may operate in a loop to adapt sensor data. For instance, in response to the discriminator model failing to correctly classify the first object from the first sensor data, the generator model may generate second sensor data representative of a modified object (e.g., a second object) including at least a modified element of the first object. The second sensor data including the modified/second object may be fed back to the discriminator model as an input. The goal of the generator model may be to generate a modified/second object that the discriminator model can successfully classify or identify. To that end, the loop may continue until the discriminator model can successfully classify an object from sensor data generated (augmented or modified) by the generator model (e.g., classify with a specified level of confidence).

In some embodiments, the first and second sensor data may correspond to first and second images, respectively, and the generator model may generate the second sensor data by modifying one or more pixels of the first image. In some instances, the modified element may be associated with at least one of a size, a shape, a color, a white balance, or a saturation representative of the first object. In some instances, the generator model may generate the second sensor data by adding random elements to the first sensor data (e.g., based on random input data). In some embodiments, the first and second sensor data may be Radio Detection and Ranging (RADAR) sensor data, Light Detection and Ranging (LIDAR) sensor data, or any suitable type of sensor data.

In the case when the discriminator model can successfully classify the modified/second object from the second sensor data, a difference between the first object and the modified/second object can be determined and used to train an ML model (e.g., the discriminator model, the generator model, or another ML model). In an embodiment, the generator model may be trained or adapted, based at least in part on the difference between the first object and the modified/second object, to modify sensor data associated with the first sensing condition so that the discriminator model (that is trained for the second sensing condition) may correctly identify object(s) from the modified sensor data. In another embodiment, the generator model may be trained or adapted, based at least in part on the difference between the first object and the modified/second object, to generate simulated sensor data associated with the first sensing condition. In this way, the simulated sensor data may be used to train the discriminator model to classify objects captured under the first sensing condition instead of collecting or capturing new data under the new sensing condition, which can be time consuming and costly. In yet another embodiment, the difference between objects associated with the first sensing condition and the second sensing condition can be used to modify simulated digital assets (e.g., plants, street lights, etc.) used by the simulation model instead of creating a separate set of simulation digital assets specific to the first sensing condition, which can again be time consuming and costly.

Accordingly, the systems, schemes, and mechanisms described herein can advantageously enable ML models (e.g., the discriminator model and/or the generator model) to be trained automatically for identifying or classifying objects in a new city or new environmental condition. Consequently, the simulation model can be quickly and automatically trained and adapted for a new city or a new environmental condition.

In a further embodiment of the present disclosure, after the generator model is trained to modify sensor data captured under the first sensing condition into sensor data that the discriminator model (trained for the second sensing condition) can correctly identify objects from, the trained generator model and the discriminator model can be deployed in a vehicle (e.g., that is fully automated or semi-automated) and operate in real-time under the first sensing condition (e.g., operating in an environment representing the first sensing condition). For instance, the vehicle may capture, using a set of sensors of the vehicle under the first sensing condition, first sensor data comprising a representation of a first object. The generator model at the vehicle may generate second sensor data representative of a modified/second object comprising at least a modified element of the first object. The discriminator model at the vehicle may classify the modified/second object from the second sensor data. The sensor data modification performed by the generator model may enable the discriminator model to correctly identify or classify the modified/second object from the second sensor data even though the discriminator model was trained under a different sensing condition (e.g., the second sensing condition) than the current sensing condition (e.g., the first sensing condition).

Accordingly, the systems, schemes, and mechanisms described herein can further advantageously reuse a ML model (e.g., the discriminator model) trained for one sensing condition in a vehicle for deployment under another sensing condition with the assistance of a trained generator model. Consequently, autonomous vehicles can be quickly deployed in a new city or a new environmental condition.

As used herein, the terms "sensor data adaptation," "sensor data augmentation," and "sensor data modification" may refer to adding, removing, or modifying one or more element(s) in sensor data. As used herein, the terms "object identification," "object classification," and "object detection" may refer to an ML model predicting or recognizing an object as a certain object type or category from sensor data.

Example Autonomous Vehicle

FIG. 1 illustrates an exemplary autonomous vehicle 10 with sensor data adaptation, according to some embodiments of the present disclosure.

As depicted in FIG. 1, the autonomous vehicle 10 may generally include a chassis 12, a body 14, front wheels 16, and rear wheels 18. The body 14 may be arranged on the chassis 12 and encloses components of the autonomous vehicle 10. The body 14 and the chassis 12 may jointly form a frame. The front wheels 16 and rear wheels 18 may be rotationally coupled to the chassis 12 near a respective corner of the body 14. In some examples, the chassis 12 may differ from the chassis on which the sensor arrays are mounted. For example, the sensor arrays can be mounted on the roof of the autonomous vehicle 10.

In various embodiments, the autonomous vehicle 10 may be an autonomous vehicle and the system 100 and/or components thereof may be incorporated into the autonomous vehicle 10. The autonomous vehicle 10 may be, for example, a vehicle that may be automatically controlled to carry passengers and/or cargo from one location to another. While the autonomous vehicle 10 may be depicted as a passenger car in FIG. 1, any other vehicle, including motorcycles, trucks, sport utility vehicles (SUVs), recreational vehicles (RVs), marine vessels, aircraft, and the like, can also be used as an autonomous vehicle.

In an example, the autonomous vehicle 10 may correspond to a level four or level five automation system under the Society of Automotive Engineers (SAE) "J3016" standard taxonomy of automated driving levels. Using this terminology, a level four system may indicate "high automation," referring to a driving mode in which the automated driving system performs aspects of the dynamic driving task, even if a human driver does not respond appropriately to a request to intervene. A level five system may indicate "full automation," referring to a driving mode in which the automated driving system performs aspects of the dynamic driving task under roadway and environmental conditions that can be managed by a human driver. Implementations in accordance with the present subject matter are not limited to any taxonomy or rubric of automation categories. Furthermore, systems in accordance with the present disclosure can be used in conjunction with any autonomous or other vehicle that utilizes a navigation system and/or other systems to provide route guidance.

As shown, the autonomous vehicle 10 may generally include a propulsion system 20, a transmission system 22, a steering system 24, a brake system 26, a sensor system 28, an actuator system 30, data storage device 32, controller 34, and a communication system 36. The propulsion system 20 can, in various embodiments, include an internal combustion engine, an electric machine such as a traction motor, and/or a fuel cell propulsion system. The transmission system 22 may be configured to transmit power from the propulsion system 20 to the front wheels 16 and rear wheels 18 according to selectable speed ratios. According to various implementations, the transmission system 22 can include a step-ratio automatic transmission, a continuously-variable transmission, or other appropriate transmission.

The brake system 26 may be configured to provide braking torque to the front wheels 16 and rear wheels 18. Brake system 26 can, in various embodiments, include friction brakes, brake by wire, a regenerative braking system such as an electric machine, and/or other appropriate braking systems.

The steering system 24 may influence a position of the front wheels 16 and/or rear wheels 18. While depicted as including a steering wheel 25 for illustrative purposes, in some embodiments contemplated within the scope of the present disclosure, the steering system 24 may not include a steering wheel.

The sensor system 28 may include one or more sensing devices 40a-40n that sense observable conditions of the exterior environment and/or the interior environment of the autonomous vehicle 10. The sensing devices 40a-40n can include RADAR sensors, LIDAR sensors, global positioning systems (GPSs), optical cameras, thermal cameras, time-of-flight (TOF) cameras, ultrasonic sensors, speedometers, compasses, and/or other sensors.

The actuator system 30 may include one or more actuator devices 42a-42n that control one or more vehicle features such as the propulsion system 20, the transmission system 22, the steering system 24, and the brake system 26. In various embodiments, the autonomous vehicle 10 can also include interior and/or exterior vehicle features not illustrated in FIG. 1, such as various doors, a trunk, and cabin features such as air conditioning, music players, lighting, touch-screen display components (such as those used in connection with navigation systems), and the like.

The data storage device 32 may store data for use in automatically controlling the autonomous vehicle 10. In various implementations, the data storage device 32 may store defined maps of the navigable environment. In various implementations, the defined maps may be predefined by and obtained from a remote system. For example, the defined maps may be assembled by the remote system and communicated to the autonomous vehicle 10 (wirelessly and/or in a wired manner) and stored in the data storage device 32. Route information can also be stored within the data storage device 32—i.e., a set of road segments (associated geographically with one or more of the defined maps) that together define a route that the user might take to travel from a start location (e.g., the user's current location) to a target location. Also, in various implementations, the data storage device 32 may store ML models 38 that are trained for identifying objects from sensor data captured by the sensor system 28. According to some embodiments of the present disclosure, the ML models 38 may include a generator ML model and a discriminator ML model. The discriminator ML model can be trained for object identification under a different city or environment than the city or environment in which the autonomous vehicle 10 may currently be operating. However, with the assistance of the generator ML model providing sensor data adaptation, the discriminator ML model can correctly identify objects from sensor data acquired in the current city or environment as will be discussed in detail below.

In general, the data storage device 32 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any data storage devices or memory elements discussed herein should be construed as being encompassed within the broad term "memory." As will be appreciated, the data storage device 32 can be part of the controller 34, separate from the controller 34, or part of the controller 34 and part of a separate system.

The controller 34 may include a processor 44 and a computer-readable storage device or media 46. The processor 44 can be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing computer instructions. The computer-readable storage device or media 46 can include volatile and non-volatile storage in ROM, RAM, and keep-alive memory (KAM), for example. KAM may be a persistent or non-volatile memory that can store various operating variables while the processor 44 is powered down. The computer-readable storage device or media 46 can be implemented using any of a number of memory devices such as PROMs (programmable read-only memory), EPROMs (electrically PROM), EEPROMs (electrically erasable PROM), flash memory, or any other electric, magnetic, optical, resistive, or combination memory devices capable of storing data, some of which represent executable instructions, used by the controller 34 in controlling the autonomous vehicle 10. As will be appreciated, while the computer-readable storage device or media 46 is depicted in FIG. 1 as part of the controller 34, the computer-readable storage device or media 46 can be part of the data storage device 32.

The instructions can include one or more separate programs that comprise an ordered listing of executable instructions for implementing logical functions. The instructions, when executed by the processor 44, can receive and process signals from the sensor system 28, perform logic, calculations, methods and/or algorithms for automatically controlling the components of the autonomous vehicle 10, and generate control signals transmitted to the actuator system 30 to control the components of the autonomous vehicle 10 based on the logic, calculations, methods, and/or algorithms. Although one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to control features of the autonomous vehicle 10. In some embodiments, as will be discussed in detail below, the controller 34 can perform objection identification or classification with sensor data adaptation or augmentation using the ML models 38. For instance, the ML models 38 may include a generator model and a discriminator model as described below with reference to FIG. 5. In some embodiments, as will be discussed in detail below, the computer-readable storage device or media 46 can store instructions, that when executed by the processor 44, may perform object identification or classification with sensor data augmentation using the ML models 38.

The communication system 36 may wirelessly communicates information to and from other entities 48, such as other vehicles ("V2V" communication), infrastructure ("V2I" communication), remote transportation systems, and/or user devices. In an example, the communication system 36 may be a wireless communication system configured to communicate via a wireless local area network (WLAN) using IEEE (Institute of Electrical and Electronics Engineers) 802.11 standards or by using cellular data communication (e.g., fifth-generation (5G) under the third Generation Partnership Project (3GPP)). Additional or alternate communication methods, such as a dedicated short-range communications (DSRC) channel, may also considered within the scope of the present disclosure. DSRC channels may refer to one-way or two-way short-range to medium-range wireless communication channels specifically designed for automotive use and a corresponding set of protocols and standards.

Example Simulation Environment for Autonomous Driving

Figure 2:
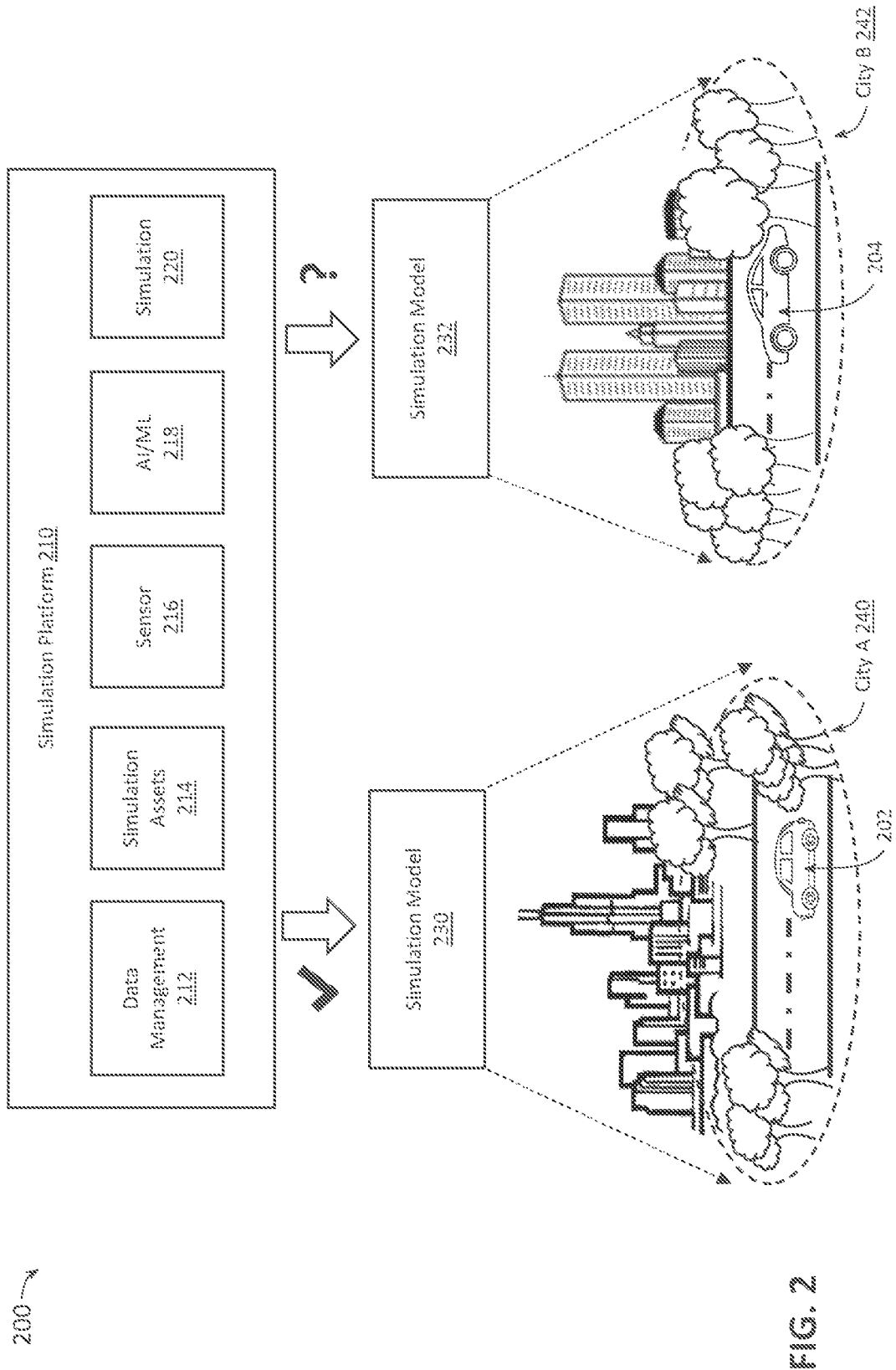
FIG. 2 illustrates an exemplary simulation environment for autonomous driving, according to some embodiments of the present disclosure.

FIG. 2 illustrates an exemplary simulation environment 200 for autonomous driving, according to some embodiments of the present disclosure. As shown in FIG. 2, the simulation environment 200 may include a simulation platform 210. The simulation platform 210 can be used for developing, training, testing, and/or validating algorithms related to autonomous driving before the algorithms are deployed onto autonomous vehicles 202 and 204, which may be substantially similar to the autonomous vehicle 10. The simulation platform 210 may be implemented by a computer system (e.g., the system 800 of FIG. 8). As further shown in FIG. 2, a simulation model 230 can be generated for a city A 240 to facilitate developing, training, testing, and/or validating algorithms for autonomous vehicles (e.g., the autonomous vehicle 202) to be deployed in the city A 240. The simulation model 230 may be generated from the simulation platform 210. The simulation platform 210 may include, but is not limited to, a data management component 212, simulation assets 214, a sensor component 216, an artificial intelligence (AI)/ML component 218, and a simulation component 220.

The data management component 212 may be a data sub-system capable of managing a large variety of data and/or a large volume of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, training data for ML models, etc.), data associated with different types of data stores (e.g., relational databases, key-value stores, document databases, graph databases, column-family databases, data analytic stores, search engine databases, time series databases, object stores, file systems, etc.), data for different types of simulations (e.g., for driving scenarios, modelling of roads, street artifacts, vehicles, pedestrians, vegetations for simulating a city, training ML models, etc.), data having different rates of change (e.g., batch, streaming, etc.), or data having other heterogeneous characteristics. The various components of the simulation platform 210 can access data stored and managed by the data management component 212 to provide their respective functionalities or simulation scenarios.

The simulation assets 214 may include objects for building a simulation model for a city (e.g., the simulation model 230 for the city A 240). The simulation assets 214 may be designed to accurately, precisely represent objects (e.g., in terms of visual aspects) in one or more cities to provide environmental realism. The objects may be 3D models and, in some instances, the simulation assets 214 may further model behaviors or dynamics (e.g., movements, trajectories) of the objects. In some instances, the simulation assets 214 may include objects corresponding to local vegetation such as local trees, shrubs, and/or small plants (e.g., specific to a certain city or geographical area). The simulation assets 214 can include sub-categories of objects, for example, corresponding to various types and/or species of trees and/or plants such as palm trees, giant ferns, ivy, bamboo shoots, flowering plants, and/or the like. In some instances, the simulation assets 214 may include local atmospheric objects such as steam clouds, smoke, tire spray, etc. (e.g., specific to a certain city or geographical area). In some instances, the simulation assets 214 may include objects corresponding to global atmospheric or weather objects such as fog, snow, rain, sunshine, etc. In some instances, the simulation assets 214 may include objects corresponding to heavy dust, pollen, trash, heavy flowing water, etc. that are unique to certain conditions. In some instances, the simulation assets 214 may include objects corresponding to street artifacts such as bridges, overpasses, medians, cobblestone, bus/train stops, street lamps, traffic lights, road structures, road elevations, ground surface types, lane markings, parks, etc. In some instances, the simulation assets 214 may include objects corresponding to pedestrians, cyclists, motorcyclists, different types of vehicles (e.g., passenger cars, motorcycles, trucks, SUVs, RVs, etc.), and/or different makes and models of vehicles. In general, the simulation assets 214 may include any suitable static objects and/or dynamic objects that may be present in a real-life scenario and may include objects in various granularity of subcategories within a certain object type.

The sensor component 216 may simulate a set of sensors to replicate physical sensors, such as one or more of a LIDAR sensor system, a camera sensor system (e.g., including TOF camera, thermal camera, ultrasonic cameras, tactical (TACT) cameras, and/or the like), a RADAR sensor system, a GPS, and an inertia measurement units (IMU) sensor system, used in an autonomous vehicle. Each sensor can be represented with different levels of fidelity, for example, from reproducing a laser beam reflecting over a certain surface or simply capturing basic sensor characteristics (in order to estimate driving speed). In general, the sensor component 216 may support various sensor parameters and/or configurations. For instance, the sensor component 216 can configure the 3D location and/or orientation of a sensor in relation to the external environment or internal to the autonomous vehicle itself, a field of view, a depth of view, etc. In some embodiments, the sensor component 216 may support ML model training, for example, by coordinating with the AI/ML component 218.

The AI/ML component 218 can provision for developing, training, and evaluating AI/ML algorithms (e.g., ML models, deep learning models, generator models, discriminator models, neural network models, etc.) that operate in an autonomous vehicle. The AI/ML component 218 can enable autonomous vehicle designers or data scientists to prepare data sets from the data management component 212; select, design, and/or train ML models; evaluate, refine, and/or deploy the models; maintain, monitor, and/or retrain the models, and so on. In some embodiments, the AI/ML component 218 may include various implementations of ML models for performing different types of prediction or inference tasks (e.g., objection classification, movement or trajectory predictions). In some embodiments, the AI/ML component 218 may utilize training data for training and/or testing AI/ML models (managed by the data management component 212) for the prediction tasks. In some examples, the training data may be a collection of sensor data (e.g., images, LIDAR sensor data, RADAR sensor data, etc.) with labelled objects to facilitate training of ML model(s) for object detection and/or sensor data adaptation or augmentation.

The simulation component 220 can enable testing and validation of various algorithms, ML models, neural networks, other development efforts for the autonomous vehicle 10/202/204, and/or other simulation components and systems. The simulation component 220 can replicate a variety of driving environments and/or reproduce real-world scenarios (e.g., from data captured or collected by a data collection vehicle and/or an autonomous vehicle driving on physical roads), including rendering geospatial information and road infrastructure (e.g., streets, lanes, crosswalks, traffic lights, stop signs, etc.), modeling the behavior of other vehicles, bicycles, pedestrians, and other dynamic elements, simulating inclement weather conditions, different traffic scenarios, and so on.

In some embodiments, the simulation component 220 can generate the simulation model 230 for the city A 240 based on data captured by one or more autonomous vehicles, such as the autonomous vehicle 202 or one or more data collection vehicles, for example, by driving the vehicle(s) to cover roads in the city A 240. In some instances, the simulation component 220 can also place the simulation assets 214 (e.g., vegetations, street artifacts, etc.) at expected locations corresponding to the actual layout in the city A 240 based on the collected data. In general, the simulation model 230 may simulate the actual city A 240, including but not limited to, road infrastructure (e.g., streets, lanes, crosswalks, traffic lights, stop signs, etc.), traffic scenarios, behaviors of pedestrians and vehicles, weather conditions, etc. such that virtualized/simulated autonomous vehicles can attempt to navigate throughout the simulated city A 240. The more accurate the simulation model 230 is in terms of representing real-life environments of the city A 240, the more effective the simulation model 240 will be to provision a simulation environment for testing and/or validating algorithms for autonomous vehicles that are to be deployed in the city A 240.

In some embodiments, one or more components in the simulation platform 210 may be trained and/or constructed based on data collected from the city A 240 to build an accurate simulation model 230 for the city A 240 as shown by the checkmark. As autonomous vehicles (e.g., the autonomous vehicle 10 of FIG. 1) are planned for deployment in another city, for example, the city B 242, it may be desirable to build a simulation model 232 replicating real-life environments in the city B 242. In some instances, the city A 240 and the city B 242 may have different road infrastructures, different environmental conditions, different vegetation, etc. As such, the simulation platform 210 may not be suitable (without additional training) for directly creating a simulation model 232 for the city B 242 (as indicated by the "?" symbol). For instance, the simulation assets 214 may not provide an accurate representation of objects in the city B 242, and thus may cause some of the ML models (trained for the city A 240) to fail in identifying objects from sensor data captured in the city B 242. As an example, an ML model trained for identifying trees in the city A 240 (e.g., San Francisco) can correctly detect a tree in the city A 240 90% of the time, but may fail to correctly detect a tree in the city B 242 (e.g., London) 50% of the time as trees in these two cities are of different types/species and therefore would provide different sensor data signatures.

Figure 3A:
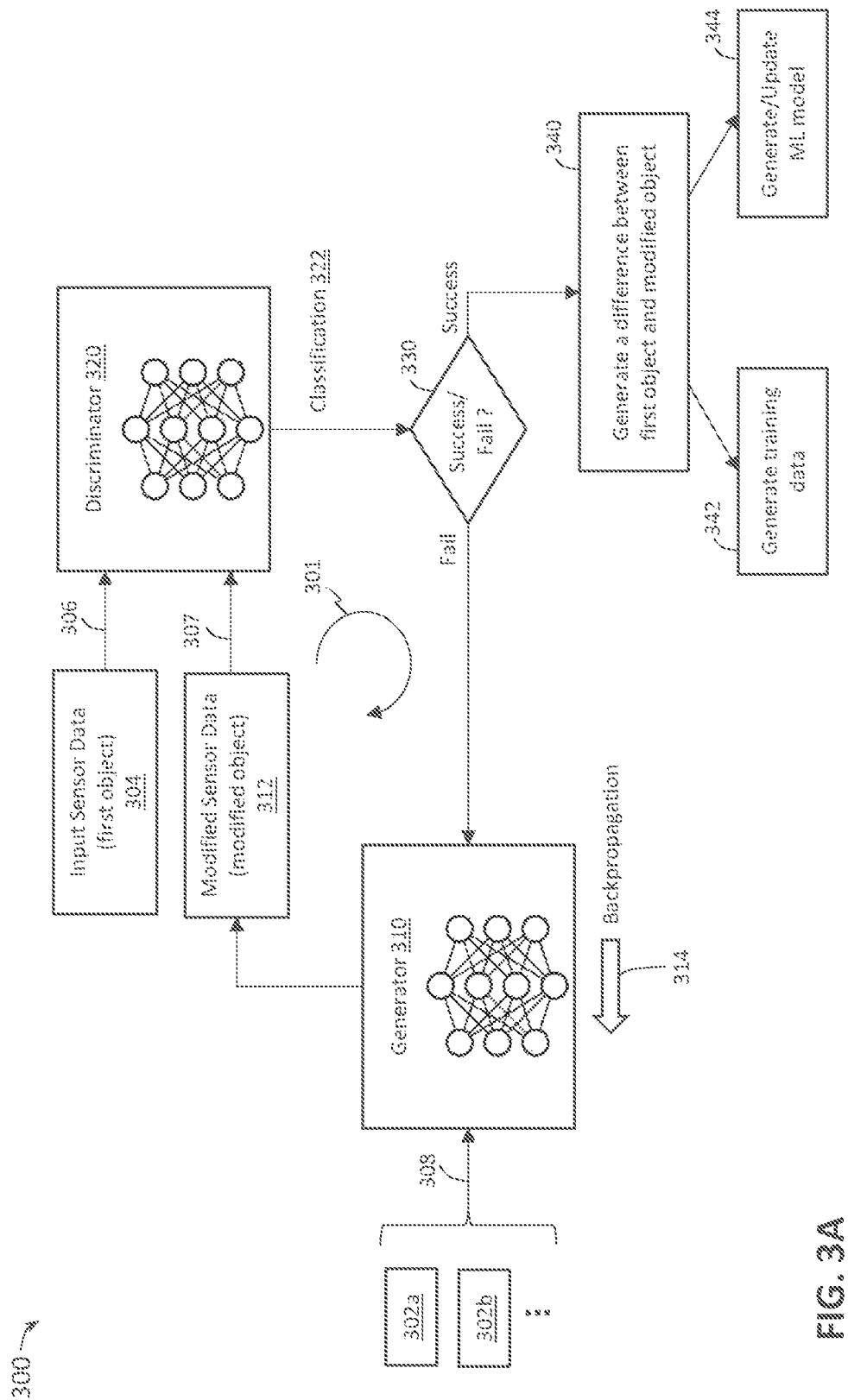
FIG. 3A illustrates an automatic sensor data adaptation process that utilizes a deep learning loop, according to some embodiments of the present disclosure.
Figure 3B:
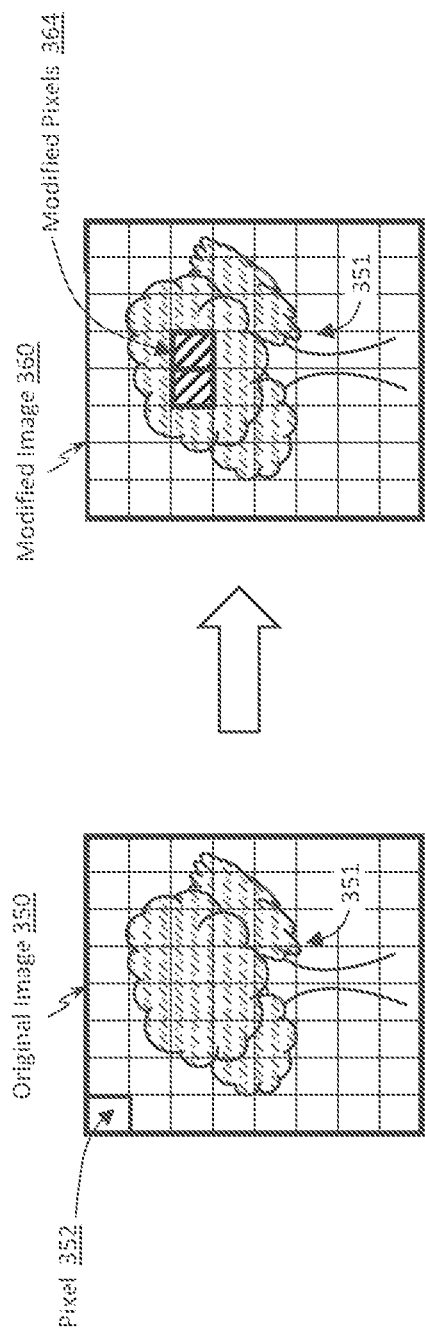
FIG. 3B illustrates an example of sensor data adaptation, according to some embodiments of the present disclosure.
Figure 4:
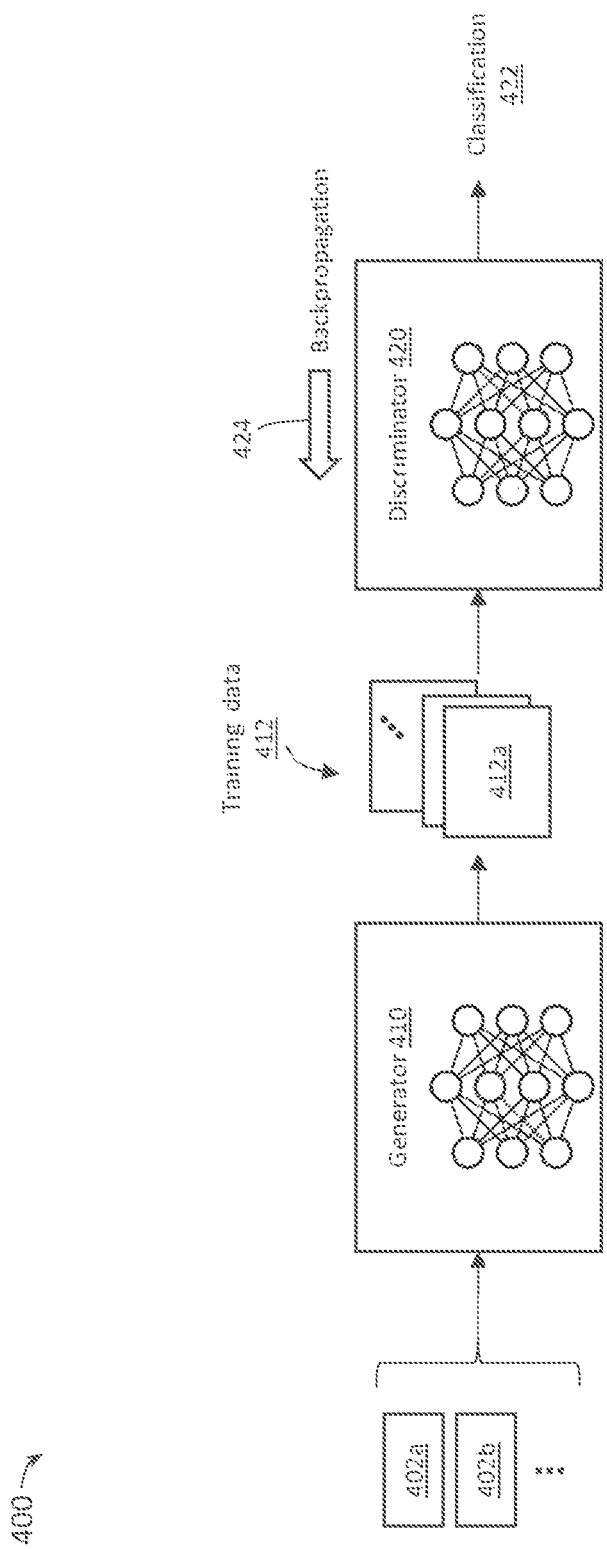
FIG. 4 illustrates a machine learning (ML) model training data generation process based on sensor data adaptation, according to some embodiments of the present disclosure.

FIGS. 3A, 3B, and 4 illustrate mechanisms for adapting components of the simulation platform 210 to generate the simulation model 232 (e.g., with ML models for object identification) for the new city B 242 using a deep learning loop.

Example Sensor Data Adaptation with Deep Learning

FIGS. 3A and 3B are discussed in relation to each other to illustrate automatic sensor data adaptation via deep learning. FIG. 3A illustrates an automatic sensor data adaptation process 300 that utilizes a deep learning loop, according to some embodiments of the present disclosure. In some embodiments, the process 300 may be implemented as part of the simulation platform 210 of FIG. 2, and may be implemented by a computer system (e.g., the system 800 of FIG. 8).

As shown in FIG. 3A, the process 300 may utilize a generator model 310 and a discriminator model 320 operating in a closed loop 301, forming a deep learning system, to perform automatic sensor data and/or ML model adaptation. At a high level, the discriminator model 320 may attempt to classify an object from a scene while the generator model 310 may add elements to and/or modify elements in the scene. For instance, the discriminator model 320 may be unable to correctly classify the object from the scene. In response, the generator model 310 may add some element(s) (e.g., random element(s)) to the scene in the hope that this addition may be sufficient for the discriminator model 320 to correctly identify the object. The generator model 310 and the discriminator model 320 may operate in the closed loop 301 (i.e., attempting to identify objects in a scene and adding elements upon failure to identify the objects) until the discriminator model 320 can correctly identify or classify the object.

The generator model 310 and the discriminator model 320 may be ML models. For instance, each of the generator model 310 and the discriminator model 320 may include a plurality of layers, for example, an input layer, followed by one or more hidden layers and an output layer. Each layer may include a set of weights and/or biases that can transform inputs received from a previous layer and the resulting outputs can be passed to the next layer. The weights and/or biases in each layer can be trained and adapted, for example, to classify objects from sensor data, in the case of the discriminator model 320, or to modify sensor data in the case of the generator model 310. Depending on the type of sensor data that the generator model 310 and the discriminator model 320 are trained to operate on, the generator model 310 and the discriminator model 320 may be implemented as neural networks, deep learning networks, convolutional neural networks (CNNs), recurrent neural networks (RNNs), or the like.

As shown in FIG. 3A, at 306, the discriminator model 320 may receive input sensor data 304 (e.g., first sensor data). The input sensor data 304 may be captured from a camera sensor (e.g., thermal camera sensor, ultrasonic camera sensor, etc.), LIDAR sensor, RADAR sensor, and/or any suitable types of sensors. The input sensor data 304 may include one or more of a two-dimensional (2D) image, a 3D image, a color image, a thermal image, an ultrasonic image, a LIDAR point cloud, and/or a RADAR point cloud. In an embodiment, the input sensor data 304 may be captured under a first sensing condition while the discriminator model 320 may be trained to identify objects in a second sensing condition different from the first sensing condition. As an example, the discriminator model 320 may be trained to classify objects (e.g., static objects and/or dynamic objects) from sensor data captured in one city (e.g., the second sensing condition) and the input sensor data 304 may be captured from another city (e.g., the first sensing condition). As another example, the discriminator model 320 may be trained to classify objects from sensor data that are captured during daytime (e.g., the second sensing condition) and the input sensor data 304 may be captured during nighttime city (e.g., the first sensing condition). As a further example, the discriminator model 320 may be trained to classify objects from sensor data captured under a certain atmospheric condition (e.g., the second sensing condition) while the input sensor data 304 may be captured under a different atmospheric condition (e.g., the first sensing condition). In general, the first sensing condition and the second sensing condition may be associated with different geographical locations and/or different environmental surroundings that would correspond to different objects and/or different representations of those objects in corresponding sensor data.

The first object may be any static object or dynamic object that may be present in the area surrounding a vehicle. Some examples of the first object may include vegetation, such as local trees, shrubs, and/or small plants, atmospheric elements, such as a steam cloud, smoke, tire spray, fog, snow, rain, sunshine, heavy dust, pollen, trash, heavy flowing water, street artifacts, such as bridges, overpasses, medians, cobblestone, bus/train stops, street lamps, traffic lights, road structures, road elevations, ground surface types, lane markings, parks, pedestrians, cyclists, motorcyclists, passenger cars, motorcycles, trucks, SUVs, RVs, etc.

The discriminator model 320 may operate on the input sensor data 304. For example, the input sensor data 304 may be processed by each layer of the discriminator model 320 (in a feedforward direction), and the discriminator model 320 may output a classification 322. The classification 322 may include a confidence level of an object in the input sensor data 304 being identified as a certain object type by the discriminator model 320. As an example, the input sensor data 304 may be an image of a tree (e.g., the image 350 of FIG. 3B). The discriminator model 320 may output a confidence level (e.g., a certain percentage) of a tree being identified from the input sensor data 304.

At 330, a decision may be made to determine whether the discriminator model 320 can successfully classify the first object from the input sensor data 304. A successful classification may refer to the discriminator model 320 outputting a classification for the first object with a confidence level greater than a certain threshold metric. As an example, a confidence level of a tree may be greater than 90% (e.g., the threshold metric) to be considered as a successful classification. Conversely, a confidence level of a tree less than 90% (e.g., the threshold metric) is considered a failed classification.

In response to the discriminator model 320 failing to classify first the object (e.g., with a confidence level less than the threshold metric), the process 300 may proceed to use the generator model 310 to generate modified sensor data 312. The modified sensor data 312 may include or otherwise represent a modified/second object, including at least a modified element of the first object. In some instances, the modified element may be associated with at least one of a size, a shape, a color, a white balance, or a saturation representative of the first object. Referring to the example where the input sensor data 304 is an input image of a tree, the modified sensor data 312 may include one or more pixels of the input image corresponding to the tree being modified (e.g., the image 360 of FIG. 3B). In some instances, the modified pixels may correspond to the shape, size, or color of the tree leaves, branches, or tree trunk. Additionally or alternatively, the modified pixels may be associated with the lighting and/or atmospheric conditions, for example, the effects of sunlight, street lamps, rain, snow, fog, pollens, dust, etc. on the tree. In other examples, the sensor data 302 may be a point cloud (e.g., captured from a LIDAR sensor or a RADAR sensor). The point cloud may include a set of data points in the form of a 3D object. Each data point may be represented by a 3D coordinate (x, y, z). To generate the modified sensor data 312, the generator model 310 may add positional noise to the point cloud. That is, the generator model 310 can modify the positions (the 3D coordinates) of the data points in the 3D space by adding random data to the 3D coordinates of the data points. Additionally or alternatively, the generator model 310 may modify the intensity values associated with the point cloud. An intensity value (associated with a point cloud data point) may correspond to the return strength of a beam as the beam hits an object surface. The intensity value can be dependent on the sensor used to capture the point cloud, an angle of incidence (the angle between the beam and the object surface that the beam hits), the material of the surface, the color of the surface, the roughness of the surface, the moisture content, etc.

In some embodiments, one or more input data 302 (shown as 302a and 302b) at 308 can be input to the generator model 310, and the generator model 310 may generate the modified sensor data 312 based on the one or more input data 302. In some instances, the input data 302a may be a random input sequence. In some instances, the input data 302 may also include sensor data (e.g., real images captured from a camera, a LIDAR point cloud, etc.) captured under the first sensing condition, sensor data (e.g., real images) captured under the second sensing condition, and/or the input sensor data 304. In some embodiments, the generator model 310 may be specifically trained to generate modified sensor data of a particular object (e.g., a tree, a palm tree, an oak tree, a street lamp, a traffic light, a vehicle, a vehicle of a certain make and model, a pedestrian, a cyclist, a motorcyclist, etc.).

At 307, the modified sensor data 312 can be fed back to the discriminator model 320 as input (thus forming the closed loop 301). The discriminator model 320 may repeat the process of classification for the modified sensor data 312 in a similar way as for the input sensor data 304. For instance, the modified sensor data 312 may be processed by each layer of the discriminator model 320, and the discriminator model 320 may output another classification 322, which may include a set of classifications/identities for the object (e.g., the modified object is a conifer tree) and a confidence score for each classification/identity (e.g., 92% confidence that the modified object is a conifer tree).

The process 300 may repeat the decision 330 for the classification 322 of the modified sensor data 312. If the discriminator model 320 fails to correctly classify the modified/second object from the modified sensor data 312, the loop 301 can be repeated again (i.e., the generator model 310 generating new modified sensor data and the discriminator model 320 attempting to identify an object from the new modified sensor data). In general, the loop 301 may continue until the discriminator model 320 can successfully identify a modified object from modified sensor data generated by the generator model 310. As an example, the decision at 330 may determine that the discriminator model 320 successfully classified the modified object (e.g., with a confidence level greater than or equals to the threshold metric) from the modified sensor data 312. In response, the process 300 may proceed to 340.

At 340, a difference between the first object and the modified/second object may be determined. At 342, the difference between the first object and the modified/second object can be used to generate and/or update ML model(s) (e.g., the generator model 310, the discriminator model 320, and/or any other ML model). Additionally or alternatively, at 344, training data for testing the ML model under the first sensing condition can be generated. The difference may include one or more of a hue, a white balance, a saturation, a size, a shape, etc. between the first object and the modified/second object. Depending on the sensor data type, the difference may be in the form of a pixel value difference for images or a positional data difference and/or intensity value difference for point clouds. In some examples, the difference may be determined automatically based on a comparison between the first object and the modified/second object. For instance, a first metric associated with a hue, a white balance, or a saturation may be computed for the first object and a second metric (with the same measure or qualifying type) may be computed for the modified/second object, and the difference may be determined based on a difference between the first metric and the second metric. In some examples, the input sensor data 304 and the modified sensor data 312 may be examined by a specialist to determine the difference between the input sensor data 304 and the modified sensor data 312. In general, the outputs of the deep learning system (e.g., the difference determined at 340) may be a set of parameters or a data transform function related to physical aspects (e.g., shape, size), visual aspects (e.g., color, hue, white balance, saturation, intensity), and/or behavioral aspects (e.g., trajectory of movements) of an object that can be applied to other labeled objects in a simulation platform such as the simulation platform 210.

In some embodiments, the generator model 310 may be specifically designed to modify or generate sensor data corresponding to a certain object. As an example, there may be one generator model 310 trained to generate modified sensor data for trees associated with the first sensing condition, and there may be another generator model 310 trained to generate modified sensor data for traffic lights associated with the first sensing condition. There may be one generator model 310 trained to generate modified sensor data for palm trees associated with the first sensing condition, and there may be another generator model 310 trained to generate modified sensor data for oak trees associated with the first sensing condition. In general, a generator model 310 can be trained to identify or classify objects at any suitable level of object category granularity.

In some embodiments, while the loop 301 is being repeated, the generator model 310 can be trained at the same time. For instance, if the discriminator model 320 fails to classify an object from modified sensor data generated by the generator model 310, the modified sensor data may be labelled as a failure and the generator model 310 may be trained not to generate that particular modification made to the modified sensor data. If, however, the discriminator model 320 successfully classified an object from modified sensor data generated by the generator model 310, the modified sensor data may be labelled as a success and the generator model 310 may be trained to generate that particular modification made to the modified sensor data. The training of the generator model 310 may be based on a backpropagation process 314. The backpropagation process 314 may perform a backward pass through the layers in the generator model 310 while adjusting the weights and/or biases at each layer. The backpropagation process 314 can be repeated to minimize an error (e.g., a gradient) between the output of the generator model 310 and a desired output (e.g., a desired modified characteristic such as hue, white balance, saturation, size, shape, behaviors, dynamics, etc.) of the generator model 310.

FIG. 3B illustrates an example of sensor data adaptation, according to some embodiments of the present disclosure. As shown in FIG. 3B, an original image 350 may include a plurality of pixels 352 illustrating an image of a tree 351. The original image 350 may be modified into a modified image 360. In an embodiment, the original image 350 and the modified image 360 may correspond to the input sensor data 304 and the modified sensor data 312, respectively, shown in FIG. 3A. For example, the original image 350 may be captured by a camera sensor under the first sensing condition, and the modified image 360 may be generated or adapted by the generator model 310 in response to the discriminator model 320 failing to classify the tree 351 in the original image 350 as a tree.

As an example, the first sensing condition may correspond to the city B 242 of FIG. 2 (e.g., the new city to be modelled by the simulation platform 210), and the second sensing condition may correspond to the city A 240 of FIG. 2 (e.g., the city for which the simulation platform 210 is built and trained). As a further example, the discriminator model 320 trained for identifying trees in the city A 240 can correctly detect a tree from sensor data collected from the city A 240 90% of the time, but may fail to correctly detect a tree from sensor data collected from the city B 242 50% of the time. In this case, the generator model 310 may fill in a set of pixels within the object (e.g., the tree 351) in the original image 350 until the discriminator model 320 can correctly identify the object as tree. As shown in the modified image 360, pixels 364 are modified by the generator model 310. That is, in some instances, the generator model 310 may take the original image 350 (of the tree 351) captured under the first sensing condition as an input and output the modified image 360 with the tree 351 having a modified element (e.g., the modified pixels 364). Based on the changes (e.g., the modified pixels) introduced to the modified image 360, the simulation can automatically determine (based on the modified pixels 364) why the discriminator model 320 fails to correctly identify the object as a tree in the original image 350.

In some embodiments, the simulation assets 214 in the simulation platform 210 can be modified or new simulation assets 214 can be generated based on the determined difference between the input sensor data 304 (e.g., the original image) and the modified sensor data 312 (e.g., the modified image 360) to facilitate simulation of the first sensing condition. That is, the deep learning system in the process 300 can output a set of parameters (e.g., at 340) that can be used to automatically modify the simulation assets 214 (e.g., objects) in the simulation platform 210. In this manner, the simulation assets 214 can be quickly adapted to simulate a model (e.g., the model 232) for a new city (e.g., the city B 242) and/or new environmental surrounding.

In some embodiments, the differences or set of parameters output by the deep learning system in the process 300 (e.g., at 340) can be used to train or adapt the generator model 310 to generate training data set for training the discriminator model 320 to identify objects from sensor data corresponding to the first sensing condition as shown in FIG. 4. In this manner, ML algorithms can automatically learn to predict and/or identify scenes in a new city (e.g., the city B 242) and/or new environmental surrounding.

Figure 5:
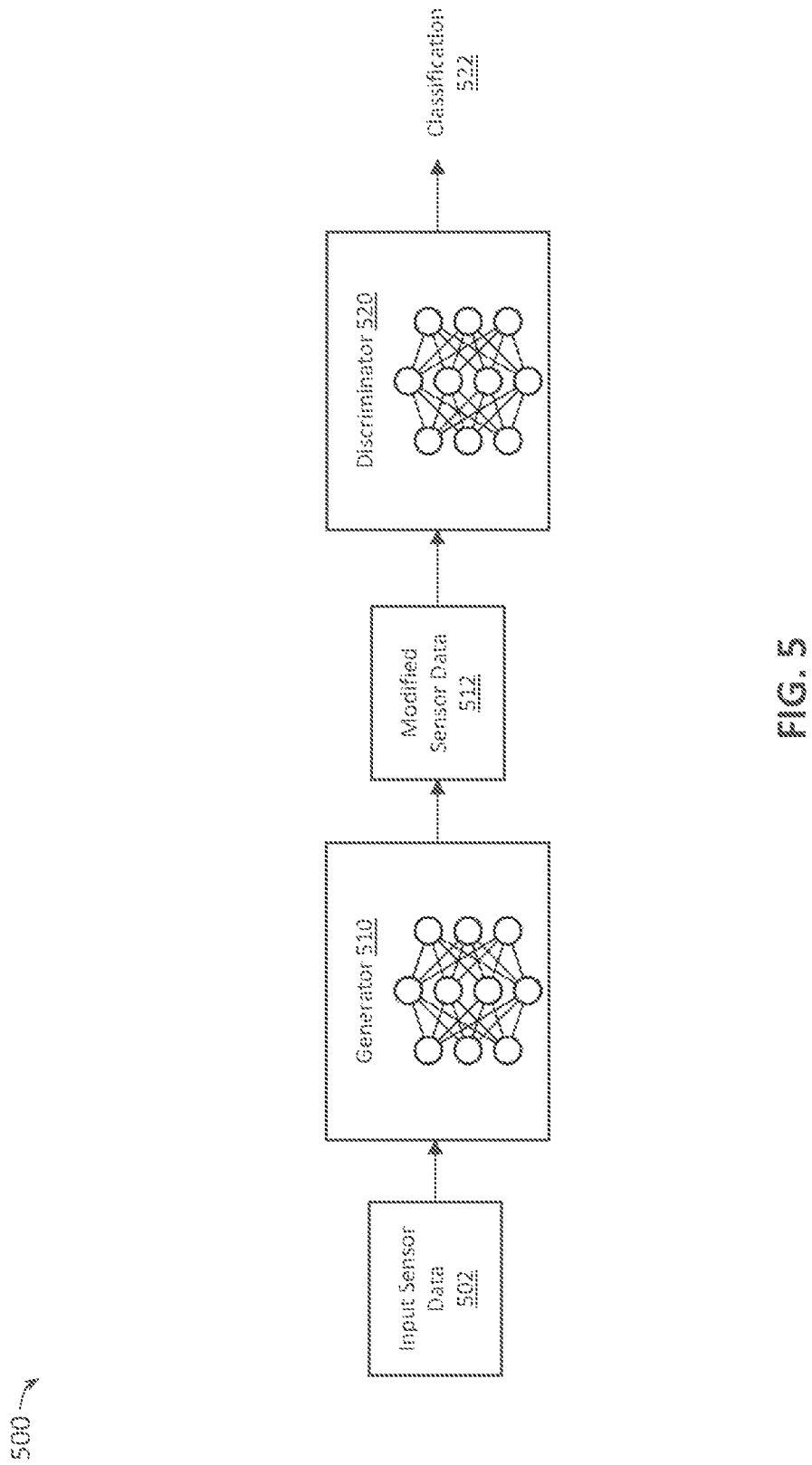
FIG. 5 illustrates a real-time object detection process with sensor data adaptation, according to some embodiments of the present disclosure.

In some embodiments, the differences or set of parameters output by the deep learning system in the process 300 (e.g., at 340) can be used to train or adapt the generator model 310 to modify sensor data captured under the first sensing condition so that the discriminator model 320 (trained for object identification under the second sensing condition) may correctly detect and identify objects when operating under the first sensing condition without having to re-train the discriminator model 320 as shown in FIG. 5.

In some instances, the generator model 310 and the discriminator model 320 may be substantially similar to a generator model and discriminator model of a generative adversarial network (GAN), respectively. However, the generator model 310 and the discriminator model 320 in the process 300 operate in a closed loop and the output or the difference determined between the input sensor data 304 and the modified sensor data 312 may be used to modify simulation data (e.g., simulation assets 214 or training data) and/or simulation models (e.g., ML models).

FIG. 4 illustrates a ML data training data generation process 400 based on sensor data adaptation, according to some embodiments of the present disclosure. In some embodiments, the process 400 may be implemented as part of the simulation platform 210 of FIG. 2, and may be implemented by a computer system (e.g., the system 800 of FIG. 8).

The process 400 may utilize a generator model 410 to generate training data 412 to train a discriminator model 420 for object classification or identification. In some embodiments, the generator model 410 may be trained to generate training data associated with a first sensing condition. For instance, the generator model 410 may correspond to the generator model 310 of FIG. 3 after the generator model 310 is trained, based at least in part on a difference between the input sensor data 304 and the modified sensor data 312, to generate training data as discussed above with reference to FIG. 3 and the training may be repeated for a large set of training data and corresponding objects. The discriminator model 420 may correspond to the discriminator model 320 trained to identify objects from sensor data captured under a second sensing condition as discussed above with reference to FIG. 3. The first sensing condition and the second sensing condition may be associated with at least one of different geographical locations, different times of the day, and/or different atmospheric conditions as discussed above.

As shown in FIG. 4, the generator model 410 may generate a plurality of training data 412. In some embodiments, the generator model 410 may generate the training data 412 based on one or more input data 402 (shown as 402a and 402b). The input data 402 may include random noise input, sensor data captured under the first sensing condition, sensor data captured under the second sensing condition, simulated sensor data simulated for the first sensing condition, and/or simulated sensor data simulated for the second sensing condition. The training data 412 be sensor data with labelled objects (e.g., labelled vegetations, labelled street artifacts, labelled environmental/atmospheric/weather conditions). The training data 412 may include 2D images, 3D images, color images, thermal images, ultrasonic images, LIDAR point clouds, and/or RADAR point clouds. In some embodiments, different generator models 410 may be trained to generate training data of different types of images. For instance, one generator model 410 may be trained to generate color images for the first sensing condition, another generator model 410 may be trained to generate LIDAR point clouds for the first sensing condition, and so on.

The training data 412 may be used as inputs to the discriminator model 420 to train the discriminator model 420 to identify objects under the first sensing condition. For instance, the discriminator model 420 may operate on the training data 412a. The training data 412a may be processed by each layer of the discriminator model 420 (in a feedforward direction), and the discriminator model 320 may output a classification 422. The classification 422 may include a confidence level of an object of a certain type in the input sensor data 304 as identified by the discriminator model 420. As an example, the training data 412a may include an object labelled as a tree, and the classification 422 indicate the confidence level of the object as a tree may be less than 50%. To train the discriminator model 420, a backpropagation process 424 may be performed. The backpropagation process 424 performs a backward pass through the layers in the discriminator model 420 while adjusting the weights and/or biases at each layer. The backpropagation process 424 can be repeated to minimize an error between the output (e.g., the classification 422) of the discriminator model 420 and a desired output (e.g., with at least a 90% confidence level of the object is a tree). In some embodiments, different discriminator models 420 may be trained to classify objects from different types of images. For instance, one discriminator model 420 may be trained to classify objects from color images associated with the second sensing condition, another discriminator model 420 may be trained to classify objects from LIDAR point clouds associated with the second sensing condition, and so on.

In an embodiment, the training data 412 may include positive labelled objects or negative or bad labelled objects. For instance, the training data 412 may include a first image of a tree and may be labelled as a tree. Additionally, the training data 412 may include a second image that may be fake or bad and may be labelled as "not tree." Accordingly, the discriminator model 420 may be trained (e.g., adapting the weights in the layers) such that the discriminator model 420 may identify a tree from the first image and may identify no tree from the second image.

Example Real-Time Object Detection with Sensor Data Adaptation in a Vehicle

FIG. 5 illustrates a real-time object detection process 500 with sensor data adaptation, according to some embodiments of the present disclosure. The process 500 may be implemented by a computer system in an autonomous vehicle. In some embodiments, the controller 34 of the autonomous vehicle 10 shown in FIG. 1 may implement the process 500. In some embodiments, the computer-readable storage device or media 46 of the autonomous vehicle 10 may store instructions that, when executed by the processor 44, may perform the process 500.

The process 500 may utilize a generator model 510 to modify real-time captured sensor data prior to providing the sensor data to a discriminator model 520 for object classification. In some embodiments, the generator model 510 may be trained to modify sensor data associated with a first sensing condition into sensor data that the discriminator model 520 (trained for object identification under a second sensing condition) may correctly identify objects from. For instance, the generator model 510 may correspond to the generator model 310 of FIG. 3 after the generator model 310 is trained, based at least in part on a difference between the input sensor data 304 and the modified sensor data 312, to modify sensor data associated with the first sensing condition as discussed above with reference to FIG. 3. The discriminator model 520 may correspond to the discriminator model 320 trained to identify objects from sensor data captured under the second sensing condition as discussed above with reference to FIG. 3

As shown in FIG. 5, the generator model 510 may receive input sensor data 502, for example, acquired by a sensor system (e.g., the sensor system 28) at an autonomous vehicle (e.g., the autonomous vehicle 10, 202, 204). The input sensor data 502 may include 2D images, 3D images, color images, thermal images, ultrasonic images, LIDAR point clouds, and/or RADAR point clouds. The input sensor data 502 may include a representation of a first object. The generator model 510 may generate modified sensor data 512 from the captured input sensor data 502. The modified sensor data 512 may include a modified object (e.g., a second object) including a modified element of the first object. In some instances, the modified element may be associated with at least one of a size, a shape, a color, a white balance, a saturation, or a behavior representative of the first object.

The modified sensor data 512 may be input into the discriminator model 520. The modified sensor data 512 may be processed by each layer of the discriminator model 520 (in a feedforward direction), and the discriminator model 520 may output a classification 522. As an example, the input sensor data 502 may be an image of a tree captured from the city B 242 of FIG. 2 (e.g., while the autonomous vehicle is being driven in the city B 242). The modified sensor data 512 may include the tree with a modified element (e.g., a size, a shape, a color, a white balance, a saturation, etc.). The discriminator model 520 may be trained for object identification in the city A 240, and thus may be unable to identify the tree directly from the input sensor data 502. However, with the generator 510 modifying the input sensor data 502 and providing the modified sensor data 512 to the discriminator model 520, the discriminator model 520 may correctly identify a tree from the modified sensor data 512 and output a classification 522 indicating a tree.

Accordingly, with the assistance of the generator model 510, the discriminator model 520 may be used in a vehicle operating under the first sensing condition to classify objects for the second sensing condition without having to re-train the discriminator model 520. After the discriminator model 520 outputs a correct classification 522 for the modified object, the classification 522 may be used to facilitate subsequent autonomous driving operation(s).

While the process 500 is discussed in the context of real-time execution within a vehicle, aspects are not limited thereto. For example, the process 500 can also be implemented on the simulation platform 210 during a simulation testing phase to test the accuracy of the generator model 510 in modifying sensor data for classification by the discriminator model 520.

Figure 6:
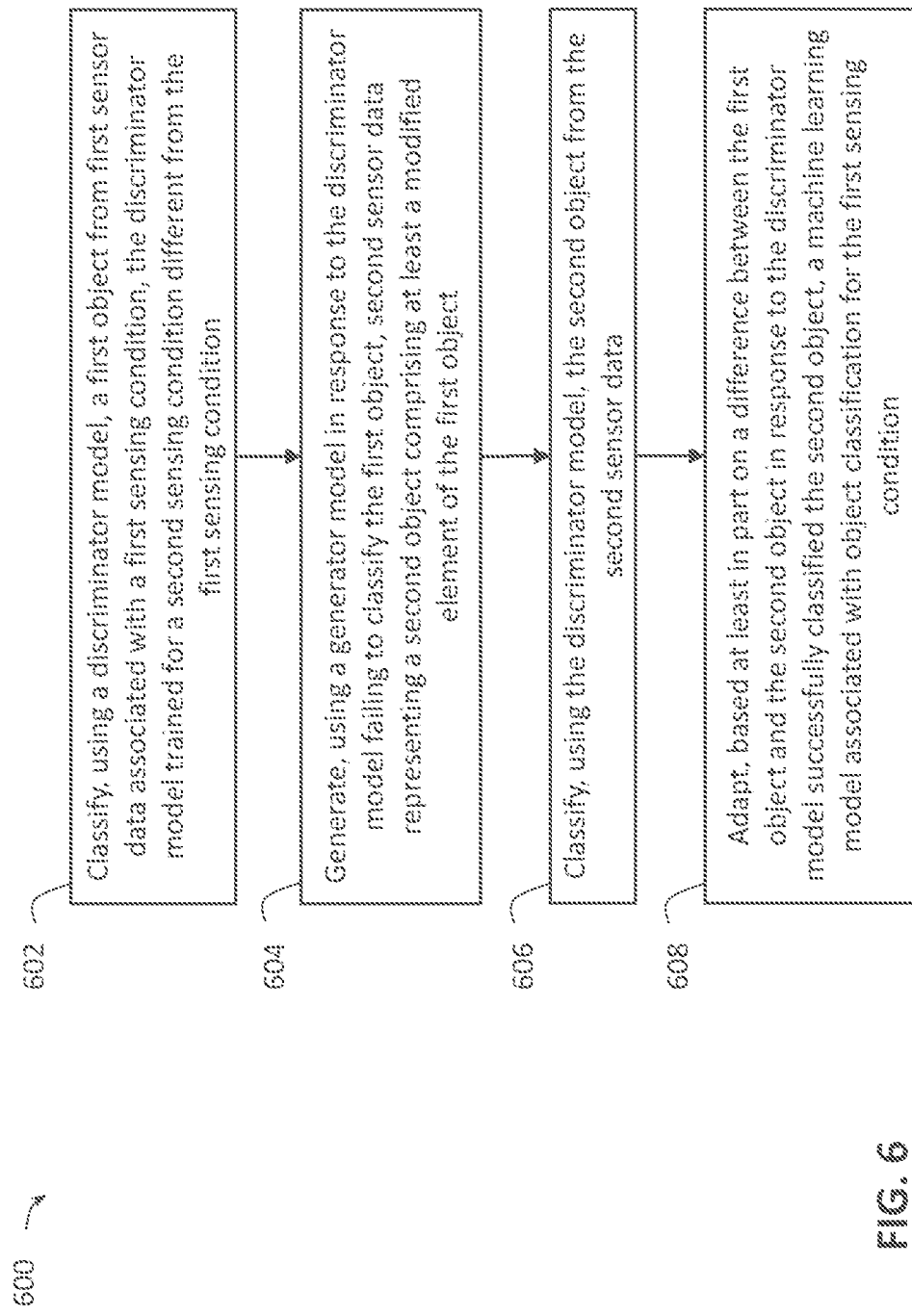
FIG. 6 is a flow diagram illustrating an automatic sensor data adaptation process that utilizes a deep learning loop, according to some embodiments of the present disclosure.

Example Methods for Sensor Data Adaptation and/or ML Model Adaptation Via Deep Learning FIG. 6 is a flow diagram illustrating an automatic sensor data adaptation process 600 that utilizes a deep learning loop, according to some embodiments of the present disclosure. The process 600 can be implemented by the computer system 800 of FIG. 8. Although the operations of the process 600 may be illustrated with reference to particular embodiments of the computer system 800 disclosed herein, the process 600 may be performed using any suitable hardware components and/or software components. The process 600 may utilize similar mechanisms discussed above with reference to FIGS. 3A, 3B, 4, and 5. Operations are illustrated once each and in a particular order in FIG. 6, but the operations may be performed in parallel, reordered, and/or repeated as desired.

At 602, a first object from first sensor data associated with a first sensing condition may be classified using a discriminator model. The discriminator model may be trained for a second sensing condition different from the first sensing condition. In some embodiments, the discriminator model may be substantially similar to the discriminator model 320, 420, and/or 520. In some embodiments, the first sensor data may include one or more of 2D image, a 3D image, a color image, a thermal image, an ultrasonic image, a point LIDAR cloud, and/or a RADAR point cloud. In some embodiments, the first sensing condition and the second sensing condition may be associated with at least one of different geographical locations, different times, and/or different atmospheric conditions. In some embodiments, means for performing the functionality of 602 can, but not necessarily, include, for example, the memory 810, the processing unit(s) 820, and/or the network communication interface 830 with reference to FIG. 8. In some examples, the discriminator model may be stored at the memory 810, for example, as the discriminator model 816, and the processing unit(s) 820 may execute instruction 812 to perform the functionality of 602.

At 604, in response to the discriminator model failing to classify (e.g., failing to satisfy a threshold confidence level or score) the first object, second sensor data representing a second object (e.g., a modified object) including at least a modified element of the first object may be generated using a generator model. In some embodiments, the generator model may be substantially similar to the generator model 310, 410, and/or 510. In some embodiments, the modified element may be associated with at least one of a size, a shape, a color, a white balance, or a saturation representative of the first object. In some embodiments, the second sensor data representative of the second object may be further generated based on random input data (e.g., received at the input of the generator model). In some embodiments, the first sensor data may correspond to the input sensor data 304, and the modified sensor data may correspond to the modified sensor data 312 discussed above with reference to FIG. 3. In some embodiments, the first sensor data may be a first image of the first object, the second sensor data may be a second image of the second object, and the generating the second sensor data includes modifying one or more pixels of the first image. The one or more modified pixels may correspond to the modified element of the first object. In some embodiments, means for performing the functionality of 604 can, but not necessarily, include, for example, the memory 810, the processing unit(s) 820, and/or the network communication interface 830 with reference to FIG. 8. In some examples, the generator model may be stored at the memory 810, for example, as the generator model 814, and the processing unit(s) 820 may execute instruction 812 to perform the functionality of 604.

At 606, the second object from the second sensor data may be classified using the discriminator model. In some embodiments, means for performing the functionality of 606 can, but not necessarily, include, for example, the memory 810, the processing unit(s) 820, and/or the network communication interface 830 with reference to FIG. 8. In some examples, the processing unit(s) 820 may execute instruction 812 to perform the functionality of 604.

At 608, in response to the discriminator model successfully classified the second object, a machine learning model associated with the first sensing condition may be adapted based at least in part on a difference between the first object and the second object. In some embodiments, the machine learning model for the adapting may correspond to the generator model, and the adapting the machine learning model may include adapting, based at least in part on the difference between the first object and the second object, the generator model to generate training data associated with object classification under the first sensing condition. In some embodiments, the machine learning model for the adapting may correspond to the discriminator model, and the adapting the machine learning model may include adapting, based at least in part on the difference between the first object and the second object, the discriminator model to classify objects captured under the first sensing condition. In some embodiments, means for performing the functionality of 608 can, but not necessarily, include, for example, the memory 810, the processing unit(s) 820, and/or the network communication interface 830 with reference to FIG. 8. In some examples, the processing unit(s) 820 may execute instruction 812 to perform the functionality of 608.

Figure 7:
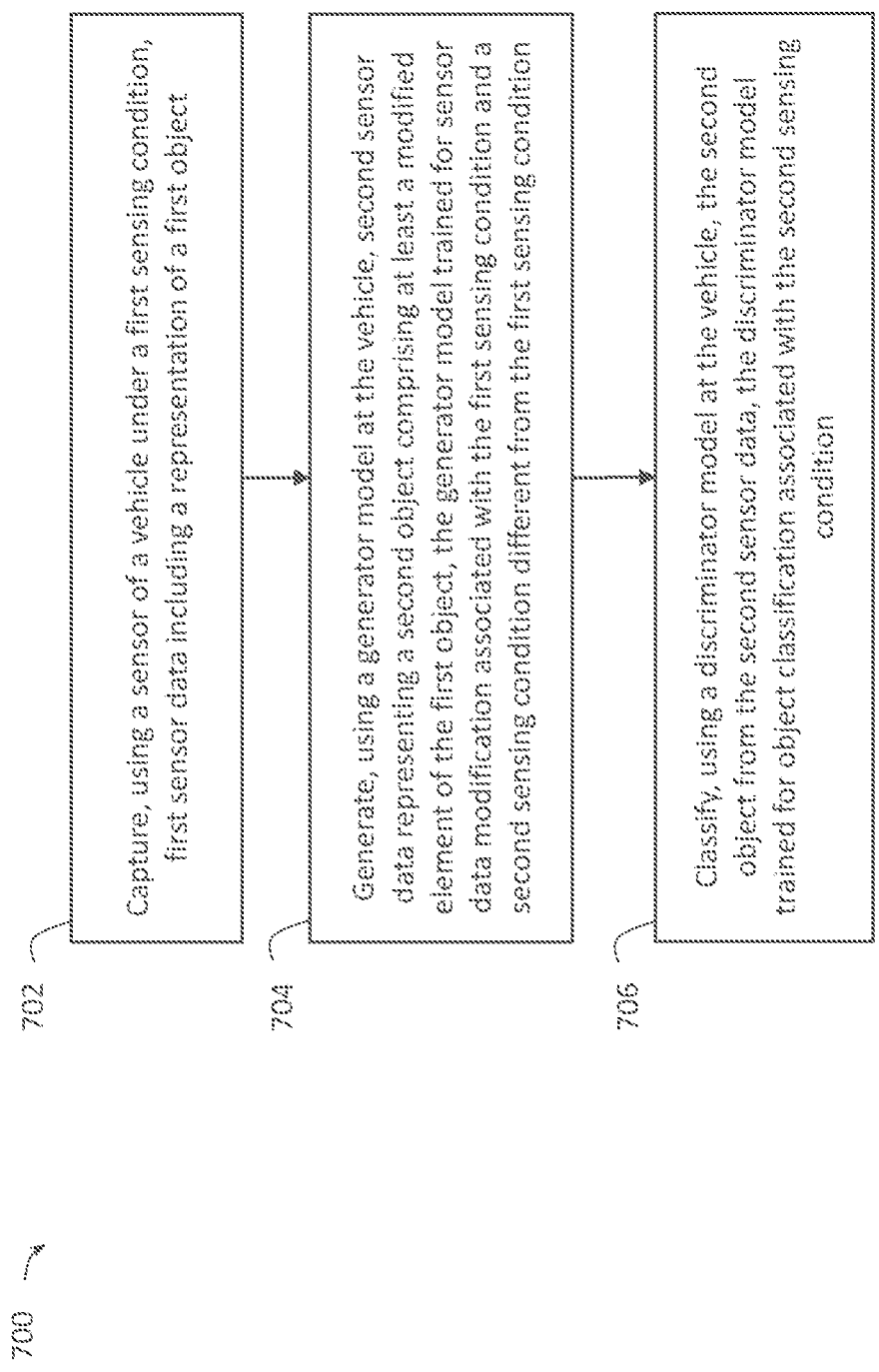
FIG. 7 is a flow diagram illustrating a real-time object detection process with sensor data adaptation, according to some embodiments of the present disclosure.

FIG. 7 is a flow diagram illustrating a real-time object detection process 700 with sensor data adaptation, according to some embodiments of the present disclosure. The process 700 can be implemented by the processor 44 at the vehicle 10 of FIG. 1 or the computer system 800 of FIG. 8. Although the operations of the process 700 may be illustrated with reference to particular embodiments of the processor 44 or the computer system 800 disclosed herein, the process 700 may be performed using any suitable hardware components and/or software components. The process 700 may utilize similar mechanism discussed above with reference to 5. Operations are illustrated once each and in a particular order in FIG. 7, but the operations may be performed in parallel, reordered, and/or repeated as desired.

At 702, first sensor data including a representation of a first object may be captured by a vehicle (e.g., the vehicle 10, 202, or 204) using a sensor. In some embodiments, the first sensor data may include one or more of 2D image, a 3D image, a color image, a thermal image, an ultrasonic image, a LIDAR point cloud, and/or a RADAR point cloud. The sensor may be any one of the sensors discussed herein. In some embodiments, the sensor may correspond to a sensor in the sensor system 28 of the autonomous vehicle 10 of FIG. 1. In some embodiments, means for performing the functionality of 702 can, but not necessarily, include, for example, the memory 810, the processing unit(s) 820, and/or the network communication interface 830 with reference to FIG. 8 or the data storage device 32 and the controller 34 of FIG. 1.

At 704, second sensor data representative of a second object (e.g., a modified object) comprising at least a modified element of the first object may be generated by the vehicle using a generator model. The generator model may be trained for sensor data modification associated with the first sensing condition and a second sensing condition different from the first sensing condition. In some embodiments, the modified element may be associated with at least one of a size, a shape, a color, a white balance, or a saturation representing the first object. In some embodiments, the second sensor data representative of the second object may be further generated based on random input data (e.g., received at the input of the generator model). In some embodiments, the first sensor data may correspond to the input sensor data 502, the modified sensor data may correspond to the modified sensor data 512, and the generator model may correspond to the generator model 510 as discussed above with reference to FIG. 5. In some embodiments, the first sensor data may be a first image of the first object, the second sensor data may be a second image of the second object, and the generating the second sensor data includes modifying one or more pixels of the first image. The one or more modified pixels may correspond to the modified element of the first object. In some embodiments, the first sensing condition and the second sensing condition may be associated with at least one of different geographical locations, different times, and/or different atmospheric conditions. In some embodiments, the generator model may be trained to modify sensor data associated with the first sensing condition into sensor data associated with the second sensing condition. In some embodiments, the generator model may be further trained based on a deep learning loop (e.g., the loop 301) including the generator model and the discriminator model, for example, as discussed above with reference to FIG. 3. In some embodiments, means for performing the functionality of 704 can, but not necessarily, include, for example, the memory 810, the processing unit(s) 820, and/or the network communication interface 830 with reference to FIG. 8 or the data storage device 32 and the controller 34 of FIG. 1.

At 706, the second object from the second sensor data may be classified by the vehicle using a discriminator model. The discriminator model may be trained for object classification associated with the second sensing condition. In some embodiments, the discriminator model may be substantially similar to the discriminator model 320, 420, and/or 520. In some embodiments, means for performing the functionality of 704 can, but not necessarily, include, for example, the memory 810, the processing unit(s) 820, and/or the network communication interface 830 with reference to FIG. 8 or the data storage device 32 and the controller 34 of FIG. 1.

Example Computing System

Figure 8:
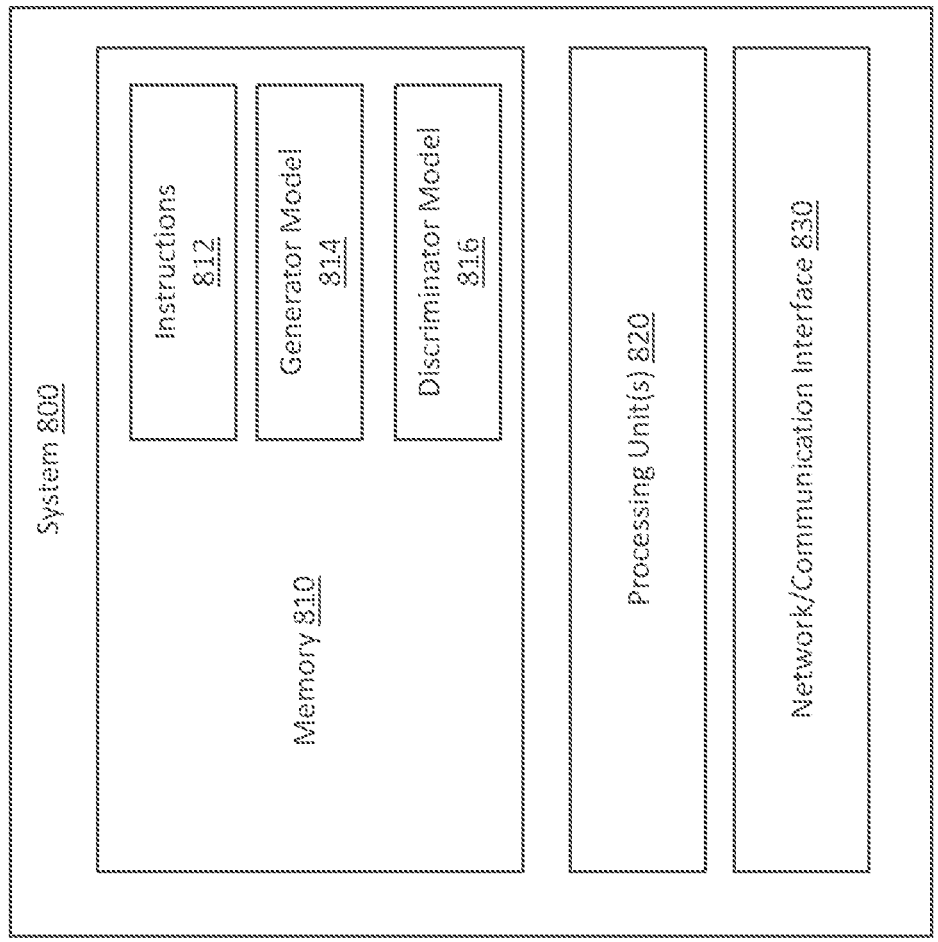
FIG. 8 illustrates an exemplary computing system used in various embodiments of the present disclosure.

FIG. 8 illustrates components of a computing system 800 used in implementations described herein. In some embodiments, the components of FIG. 8 can be present in a vehicle or an autonomous vehicle (e.g., the vehicle 10, 202, 204). In other embodiments, the components of FIG. 8 can be present in a simulation system for autonomous vehicle.

Referring to FIG. 8, system 800 can be implemented within one computing device or distributed across multiple computing devices or sub-systems that cooperate in executing program instructions. In some implementations, the system 800 can include one or more blade server devices, standalone server devices, personal computers, routers, hubs, switches, bridges, firewall devices, intrusion detection devices, mainframe computers, network-attached storage devices, smartphones and other mobile telephones, and other computing devices. The system hardware can be configured according to any suitable computer architectures such as a Symmetric Multi-Processing (SMP) architecture or a Non-Uniform Memory Access (NUMA) architecture.

The system 800 can include one or more processing units 820, which can include one or more hardware processors and/or other circuitry that retrieves and executes instructions 812 (e.g., software or firmware codes) from memory 810. The one or more processing units 820 can be implemented within one processing device, chip, or package and can also be distributed across multiple processing devices, chips, packages, or sub-systems that cooperate in executing program instructions. In one implementation, the one or more processing units 820 may include a CPU and a GPU. The GPU can execute the visual/image processing in the computing system. The GPU, or any second-order processing element independent from CPU dedicated to processing imagery and other perception data in real or near real-time, can provide a significant benefit.

The memory 810 can include any computer-readable storage media readable by one or more processing unit(s) 820 and that stores instructions 812, a generator model 814, and a discriminator model 816. The memory 810 can be implemented as one storage device and can also be implemented across multiple co-located or distributed storage devices or sub-systems. The memory 810 can include additional elements, such as a controller, that communicate with the one or more processing units 820. The memory 810 can also include storage devices and/or sub-systems on which data and/or instructions may be stored. System 800 can access one or more storage resources to access information to carry out any of the processes indicated by instructions 812.

The instructions 812, including routines for at least partially performing at least one of the processes illustrated in FIGS. 3A and 4-7, can be implemented in program instructions. Further, the instructions 812, when executed by system 800 in general or the one or more processing unit(s) 820 in particular, can direct, among other functions, the system 800 or the one or more processing units 820 to operate as described herein.

The generator model 814 and the discriminator model 816 may be trained and used for inference or prediction tasks (e.g., sensor data modification and/or object classification) as described herein. In some embodiments, the generator model 814 and the discriminator model 816 may correspond to the generator model 310 and the discriminator model 320, respectively, with reference to FIG. 3. In some embodiments, the generator model 814 and the discriminator model 816 may correspond to the generator model 410 and the discriminator model 420, respectively, with reference to FIG. 4. In some embodiments, the generator model 814 and the discriminator model 816 may correspond to the generator model 510 and the discriminator model 520, respectively, with reference to FIG. 5.

In implementations where the system 800 includes multiple computing devices, the server can use one or more communications networks that facilitate communication among the computing devices. For example, the one or more communications networks can include or be a local or wide area network that facilitates communication among the computing devices. One or more direct communication links can be included between the computing devices. In addition, the computing devices can be installed at geographically distributed locations or at one geographic location, such as a server farm or an office.

System 800 can include a communications interface 830 that provides one or more communication connections and/or one or more devices that allow for communication between system 800 and other computing systems (not shown) over a communication network or collection of networks (not shown) or the air.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Selected Examples

Example 1 is a method including classifying, using a discriminator model, a first object from first sensor data associated with a first sensing condition, where the discriminator model is trained for a second sensing condition different from the first sensing condition; generating, using a generator model in response to the discriminator model failing to classify the first object, second sensor data representative of a second object comprising at least a modified element of the first object; classifying, using the discriminator model, the second object from the second sensor data; and adapting, based at least in part on a difference between the first object and the second object in response to the discriminator model successfully classified the second object, a machine learning model associated with object classification for the first sensing condition.

In Example 2, the subject matter of Example 1 can optionally include the first sensor data being a first image of the first object, the second sensor data being a second image of the second object, and the generating the second sensor data representative of the second object including modifying one or more pixels of the first image, the one or more pixels corresponding to the modified element of the first object.

In Example 3, the subject matter of any of one Examples 1-2 can optionally include the modified element being associated with at least one of a size, a shape, a color, a white balance, or a saturation representative of the first object.

In Example 4, the subject matter of any of one Examples 1-3 can optionally include generating the second sensor data representative of the second object is further based on random data.

In Example 5, the subject matter of any of one Examples 1-4 can optionally include the first sensing condition and the second sensing condition being associated with different geographical locations.

In Example 6, the subject matter of any of one Examples 1-5 can optionally include the first sensing condition and the second sensing condition being associated with different times.

In Example 7, the subject matter of any of one Examples 1-6 can optionally include the first sensing condition and the second sensing condition being associated with different atmospheric conditions.

In Example 8, the subject matter of any of one Examples 1-7 can optionally include the machine learning model for the adapting corresponding to the generator model; and the adapting the machine learning model including adapting, based at least in part on the difference between the first object and the second object, the generator model to generate training data associated with the first sensing condition.

In Example 9, the subject matter of any of one Examples 1-8 can optionally include the machine learning model for the adapting corresponding to the discriminator model; and the adapting the machine learning model including adapting, based at least in part on the difference between the first object and the second object, the discriminator model to classify objects captured under the first sensing condition.

In Example 10, the subject matter of any of one Examples 1-9 can optionally include the first sensor data including at least one of a 2D image, a 3D image, a color image, a thermal image, an ultrasonic image, a LIDAR point cloud, or a RADAR point cloud.

In Example 11, one or more non-transitory, computer-readable media encoded with instructions that, when executed by one or more processing units, perform a method including classifying, using a discriminator model, a first object from first sensor data associated with a first sensing condition, wherein the discriminator model is trained for a second sensing condition different from the first sensing condition; generating, using a generator model in response to the discriminator model failing to classify the first object, second sensor data representative of a second object comprising at least a modified element of the first object; and classifying, using the discriminator model, the second object from the second sensor data; and adapting, based at least in part on a difference between the first object and the second object in response to the discriminator model successfully classified the second object, a machine learning model associated with object classification under the first sensing condition.

In Example 12, the subject matter of Example 11 can optionally include the first sensor data being a first image of the first object, the second sensor data being a second image of the second object, and the generating the second sensor data representative of the second object including modifying one or more pixels of the first image, the one or more pixels corresponding to the modified element of the first object.

In Example 13, the subject matter of any of one Examples 11-12 can optionally include the modified element being associated with at least one of a size, a shape, a color, a white balance, or a saturation representative of the first object.

In Example 14, the subject matter of any of one Examples 11-13 can optionally include the first sensing condition and the second sensing condition being associated with at least one of different geographical locations, different times, or different atmospheric conditions.

In Example 15, the subject matter of any of one Examples 11-14 can optionally include the adapting the machine learning model including adapting, based at least in part on the difference between the first object and the second object, at least one of the generator model to generate training data associated with the first sensing condition; the generator model to augment sensor data captured under the first sensing condition; or the discriminator model to classify objects captured under the first sensing condition.

Example 16 includes a system including a memory to store a discriminator model and a generator model, where the discriminator model is trained to classify objects associated with a first second condition; and one or more processing units configured to classify, using the discriminator model, a first object from first sensor data associated with a second sensing condition; generate, using the generator model in response to the discriminator model failing to classify the first object, second sensor data representative of a second object comprising at least a modified element of the first object; classify, using the discriminator model, the second object from the second sensor data; and adapt, based at least in part on a difference between the first object and the second object in response to the discriminator model successfully classified the second object, a machine learning model associated with object classification under the second sensing condition.

In Example 17, the subject matter of Example 16 can optionally include the first sensor data being a first image of the first object; the second sensor data being a second image of the second object; and the one or more processing units configured to generate the second sensor data representative of the second object further configured to modify one or more pixels of the first image, the one or more pixels corresponding to the modified element of the first object.

In Example 18, the subject matter of any of one Examples 16-17 can optionally include the modified element being associated with at least one of a size, a shape, a color, a white balance, or a saturation representative of the first object.

In Example 19, the subject matter of any of one Examples 16-18 can optionally include the first sensing condition and the second sensing condition being associated with at least one of different geographical locations, different times, or different atmospheric conditions.

In Example 20, the subject matter of any of one Examples 16-19 can optionally include the one or more processing units configured to adapt the machine learning model further configured to adapt, based at least in part on the difference between the first object and the second object, at least one of the generator model to generate training data associated with the first sensing condition; the generator model to augment sensor data captured under the first sensing condition; or the discriminator model to classify objects captured under the first sensing condition.

Example 21 includes a method including capturing, using a sensor of a vehicle under a first sensing condition, first sensor data comprising a representation of a first object; generating, using a generator model at the vehicle, second sensor data representative of a second object comprising at least a modified element of the first object, wherein the generator model is trained for sensor data modification associated with the first sensing condition and a second sensing condition different from the first sensing condition; and classifying, using a discriminator model at the vehicle, the second object from the second sensor data, wherein the discriminator model is trained for object classification associated with the second sensing condition.

In Example 22, the subject matter of Examples 21 can optionally include the first sensor data being a first image of the first object; the second sensor data being a second image of the second object; and the generating the second sensor data representative of the second object including modifying one or more pixels of the first image, the one or more pixels corresponding to the modified element of the first object.

In Example 23, the subject matter of any of one Examples 21-22 can optionally include the modified element being associated with at least one of a size, a shape, a color, a white balance, or a saturation representative of the first object.

In Example 24, the subject matter of any of one Examples 21-23 can optionally include the generating the second sensor data representative of the second object being further based on random input data.

In Example 25, the subject matter of any of one Examples 21-24 can optionally include the first sensing condition and the second sensing condition being associated with different geographical locations.

In Example 26, the subject matter of any of one Examples 21-25 can optionally include the first sensing condition and the second sensing condition being associated with different times.

In Example 27, the subject matter of any of one Examples 21-26 can optionally include the first sensing condition and the second sensing condition being associated with different atmospheric conditions.

In Example 28, the subject matter of any of one Examples 21-27 can optionally include the generator model being trained to modify sensor data associated with the first sensing condition into sensor data associated with the second sensing condition.

In Example 29, the subject matter of any of one Examples 21-28 can optionally include the generator model being further trained based on a deep learning loop including the generator model and the discriminator model.

In Example 30, the subject matter of any of one Examples 21-29 can optionally include the first sensor data including at least one of a 2D image, a 3D image, a color image, a thermal image, an ultrasonic image, a point cloud LIDAR image, or point cloud radar image.

Example 31 includes one or more non-transitory, computer-readable media encoded with instructions that, when executed by one or more processing units at a vehicle, perform a method including capturing, using a sensor of the vehicle under a first sensing condition, first sensor data comprising a representation of a first object; generating, using a generator model at the vehicle, second sensor data representative of a second object comprising at least a modified element of the first object, wherein the generator model is trained for sensor data modification associated with the first sensing condition and a second sensing condition different from the first sensing condition; and classifying, using a discriminator model at the vehicle, the second object from the second sensor data, wherein the discriminator model is trained for object classification associated with the second sensing condition.

In Example 32, the subject matter of Example 31 can optionally include the first sensor data being a first image of the first object; the second sensor data being a second image of the second object; and the generating the second sensor data representative of the second object including modifying one or more pixels of the first image, the one or more pixels corresponding to the modified element of the first object.

In Example 33, the subject matter of any of one Examples 31-32 can optionally include the modified element being associated with at least one of a size, a shape, a color, a white balance, or a saturation representative of the first object.

In Example 34, the subject matter of any of one Examples 31-33 can optionally include the first sensing condition and the second sensing condition being associated with at least one of different geographical locations, different times of the day, or different atmospheric conditions.

In Example 35, the subject matter of any of one Examples 31-34 can optionally include the generator model is trained to modify sensor data associated with the first sensing condition into sensor data associated with the second sensing condition based on a deep learning loop including the generator model and the discriminator model.

Example 36 includes a vehicle including at least one sensor to capture, under a first sensing condition, first sensor data comprising a representation of a first object; a memory to store a discriminator model and a generator model, wherein the discriminator model is trained to classify objects associated with a second sensing condition different from the first sensing condition, and wherein the generator model is trained for sensor data modification associated with the first sensing condition and the second sensing condition; and one or more processing units configured to generate, using the generator model, second sensor data representative of a second object comprising at least a modified element of the first object; and classify, using the discriminator model, the second object from the second sensor data.

In Example 37, the subject matter of Example 36 can optionally include the first sensor data being a first image of the first object; the second sensor data being a second image of the second object; and the one or more processing units configured to generate the second sensor data representative of the second object being further configured to modify one or more pixels of the first image, the one or more pixels corresponding to the modified element of the first object.

In Example 38, the subject matter of any of one Examples 36-37 can optionally include the modified element being associated with at least one of a size, a shape, a color, a white balance, or a saturation representative of the first object.

In Example 39, the subject matter of any of one Examples 36-38 can optionally include the first sensing condition and the second sensing condition being associated with at least one of different geographical locations, different times, or different atmospheric conditions.

In Example 40, the subject matter of any of one Examples 36-39 can optionally include the generator model being trained to modify sensor data associated with the first sensing condition into sensor data associated with the second sensing condition based on a deep learning loop including the generator model and the discriminator model.

Example 41 includes an apparatus comprising means for performing the method of any of the examples 1-10.

Example 42 includes an apparatus comprising means for performing the method of any of the examples 21-30.

Variations and Implementations

As will be appreciated by one skilled in the art, aspects of the present disclosure, in particular, aspects of using the generator model to add elements to and/or modify elements in a scene and using the discriminator model to classify an object from a scene, described herein, can be embodied in various manners (e.g., as a method, a system, a computer program product, or a computer-readable storage medium). Accordingly, aspects of the present disclosure can take the form of a hardware implementation, a software implementation (including firmware, resident software, or microcode) or an implementation combining software and hardware aspects that can generally be referred to herein as a "circuit," "module" or "system." Functions described in this disclosure can be implemented as an algorithm executed by one or more hardware processing units, e.g. one or more microprocessors of one or more computers. In various embodiments, different steps and portions of the operations of the methods described herein can be performed by different processing units. Furthermore, aspects of the present disclosure can take the form of a computer program product embodied in one or more computer-readable media having computer-readable program code embodied, e.g., stored or encoded, thereon. In various embodiments, such a computer program can, for example, be downloaded (or updated) to the existing devices and systems or be stored upon manufacturing of these devices and systems.

The foregoing disclosure presents various descriptions of certain specific embodiments. The innovations described herein can be embodied in a multitude of different ways, for example, as defined and covered by the claims and/or select examples. In the following description, reference is made to the drawings where like reference numerals can indicate identical or functionally similar elements. Elements illustrated in the drawings are not necessarily drawn to scale. Additionally, certain embodiments can include more elements than illustrated in a drawing and/or a subset of the elements illustrated in a drawing. Further, some embodiments can incorporate any suitable combination of features from two or more drawings.

The foregoing disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. Numerous implementation-specific decisions might be made to achieve the developer's specific goals, including compliance with system, business, and/or legal constraints, which may vary from one implementation to another. Additionally, while such a development effort might be complex and time-consuming; it would be a routine undertaking for those of ordinary skill in the art having the benefit of this disclosure.

In the Specification, reference might be made to spatial relationships between various components and to the spatial orientation of various aspects of components as depicted in the attached drawings. As will be recognized by those skilled in the art after a complete reading of the present disclosure, the devices, components, members, and apparatuses described herein can be positioned in any orientation. Thus, the use of terms such as "above", "below", "upper", "lower", "top", "bottom", or other similar terms to describe a spatial relationship between various components or to describe the spatial orientation of aspects of such components, describe a relative relationship between the components or a spatial orientation of aspects of such components, respectively, as the components described herein can be oriented in any direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

In addition, the terms "storage media," "computer-readable storage media," or "computer-readable storage medium" can refer to non-transitory storage media, such as a hard drive, a memory chip, and cache memory, and to transitory storage media, such as carrier waves or propagating signals.

Further, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

In one example embodiment, any number of electrical circuits of the FIGS. can be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.) and computer-readable, non-transitory memory elements can be coupled to the board based on particular configurations, processing demands, or computer designs. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have been offered for purposes of example and teaching. Such information can be varied considerably, as the specifications apply to non-limiting examples. In the foregoing description, example implementations have been described with reference to particular arrangements of components. Various modifications and changes can be made to such implementations. The description and drawings are, accordingly, to be regarded in an illustrative sense and not in a restrictive sense.

With the numerous examples provided herein, interaction may be described in terms of two, three, four, or more electrical components for purposes of clarity and example. The system can be consolidated in any suitable manner. Along similar design alternatives, any of the illustrated components, modules, and elements of the FIGS. can be combined in various possible configurations within the scope of this disclosure. In certain cases, it might be easier to describe one or more of the functionalities of a given set of flows by referencing a limited number of electrical elements. The electrical circuits of the FIGS. and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

Note that in this Specification, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might not necessarily be combined in the same embodiments.

Note that the functions related to using the generator model to add elements to and/or modify elements in a scene and using the discriminator model to classify an object from a scene, e.g. those summarized in the one or more processes shown in FIGS., illustrate some of the possible functions that can be executed by, or within, the systems illustrated in the FIGS. Some of these operations can be deleted or omitted where appropriate, or these operations can be modified or changed considerably. In addition, the timing of these operations can be altered considerably. The preceding operational flows have been offered for purposes of example and discussion. Implementations described herein provide flexibility, in that any suitable arrangements, chronologies, configurations, and timing mechanisms can be provided.

Numerous other changes, substitutions, variations, alterations, and modifications might be ascertained by one skilled in the art, and the present disclosure encompasses such changes, substitutions, variations, alterations, and modifications as falling within the scope of the appended claims. Optional features of the apparatus described above can be implemented with respect to the method or process described herein and specifics in the examples can be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
   classifying, using a discriminator model, a first object from first sensor data associated with a first sensing condition, wherein the discriminator model is trained for a second sensing condition different from the first sensing condition;
   generating, using a generator model in response to the discriminator model failing to classify the first object, second sensor data representing a second object comprising at least a modified element of the first object;
   classifying, using the discriminator model, the second object from the second sensor data; and
   adapting, based at least in part on a difference between the first object and the second object in response to the discriminator model successfully classifying the second object, a machine learning model associated with object classification for the first sensing condition,
   wherein the generating the second sensor data representing the second object is further based on random data.

2. The method of claim 1, wherein:
   the first sensor data is a first image of the first object;
   the second sensor data is a second image of the second object; and
   the generating the second sensor data representing the second object comprises:
      modifying one or more pixels of the first image, the one or more pixels corresponding to the modified element of the first object.

3. The method of claim 1, wherein the modified element is associated with at least one of a size, a shape, a color, a white balance, or a saturation representative of the first object.

4. The method of claim 1, wherein the first sensing condition and the second sensing condition are associated with different geographical locations.

5. The method of claim 1, wherein the first sensing condition and the second sensing condition are associated with different times.

6. The method of claim 1, wherein the first sensing condition and the second sensing condition are associated with different atmospheric conditions.

7. The method of claim 1, wherein:
   the machine learning model for adapting corresponds to the generator model; and
   the adapting the machine learning model comprises:
      adapting, based at least in part on the difference between the first object and the second object, the generator model to generate training data associated with the first sensing condition.

8. The method of claim 1, wherein:
   the machine learning model for adapting corresponds to the discriminator model; and the adapting the machine learning model comprises:
      adapting, based at least in part on the difference between the first object and the second object, the discriminator model to classify objects captured under the first sensing condition.

9. The method of claim 1, wherein the first sensor data comprises at least one of a two-dimensional (2D) image, a three-dimensional (3D) image, a color image, a thermal image, an ultrasonic image, a Light Detection and Ranging (LIDAR) point cloud, or a Radio Detection and Ranging (RADAR) point cloud.

10. One or more non-transitory, computer-readable media encoded with instructions that, when executed by one or more processing units, perform a method comprising:
    classifying, using a discriminator model, a first object from first sensor data associated with a first sensing condition, wherein the discriminator model is trained for a second sensing condition different from the first sensing condition;
    generating, using a generator model in response to the discriminator model failing to classify the first object, second sensor data representing a second object comprising at least a modified element of the first object;
    classifying, using the discriminator model, the second object from the second sensor data; and
    adapting, based at least in part on a difference between the first object and the second object in response to the discriminator model successfully classified the second object, a machine learning model associated with object classification under the first sensing condition,
    wherein the first sensing condition and the second sensing condition are associated with different geographical locations.

11. The one or more non-transitory, computer-readable media of claim 10, wherein:
    the first sensor data is a first image of the first object;
    the second sensor data is a second image of the second object; and
    the generating the second sensor data representing the second object comprises:

modifying one or more pixels of the first image, the one or more pixels corresponding to the modified element of the first object.

12. The one or more non-transitory, computer-readable media of claim 10, wherein the modified element is associated with at least one of a size, a shape, a color, a white balance, or a saturation representative of the first object.

13. The one or more non-transitory, computer-readable media of claim 10, wherein the first sensing condition and the second sensing condition are associated with at least one of different times, or different atmospheric conditions.

14. The one or more non-transitory, computer-readable media of claim 10, wherein the adapting the machine learning model comprises:
adapting, based at least in part on the difference between the first object and the second object, at least one of:
the generator model to generate training data associated with the first sensing condition;
the generator model to augment sensor data captured under the first sensing condition; or
the discriminator model to classify objects captured under the first sensing condition.

15. One or more non-transitory, computer-readable media encoded with instructions that, when executed by one or more processing units at a vehicle, perform a method comprising:
capturing, using a sensor of the vehicle operating under a first sensing condition, first sensor data comprising a representation of a first object;
generating, by the vehicle using a generator model, second sensor data representing a second object comprising at least a modified element of the first object, wherein the generator model is trained for sensor data modification associated with the first sensing condition; and
classifying, by the vehicle using a discriminator model, the second object from the second sensor data, wherein the discriminator model is trained for object classification associated with a second sensing condition different from the first sensing condition,
wherein the first sensing condition and the second sensing condition are associated with different atmospheric conditions.

16. The one or more non-transitory, computer-readable media of claim 15, wherein:
the first sensor data is a first image of the first object;
the second sensor data is a second image of the second object; and
the generating the second sensor data representing the second object comprises:
modifying one or more pixels of the first image, the one or more pixels corresponding to the modified element of the first object.

17. The one or more non-transitory, computer-readable media of claim 15, wherein the modified element is associated with at least one of a size, a shape, a color, a white balance, or a saturation representative of the first object.

18. The one or more non-transitory, computer-readable media of claim 15, wherein the first sensing condition and the second sensing condition are associated with at least one of different geographical locations or different times.

19. The one or more non-transitory, computer-readable media of claim 15, wherein the generator model is trained to modify sensor data associated with the first sensing condition into sensor data associated with the second sensing condition based on a deep learning loop including the generator model and the discriminator model.

* * * * *